United States Patent
Pohlack et al.

(10) Patent No.: US 10,706,147 B1
(45) Date of Patent: Jul. 7, 2020

(54) MITIGATING SIDE-CHANNEL ATTACKS VIA SHARED CACHE

(71) Applicant: Amazon Technologies, Inc., Seattle, WA (US)

(72) Inventors: Martin Thomas Pohlack, Dresden (DE); Uwe Dannowski, Moritzburg (DE)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 15/600,460

(22) Filed: May 19, 2017

(51) Int. Cl.
*G06F 21/55* (2013.01)
*H04L 29/06* (2006.01)
(Continued)

(52) U.S. Cl.
CPC .......... *G06F 21/556* (2013.01); *G06F 21/554* (2013.01); *H04L 29/06612* (2013.01);
(Continued)

(58) Field of Classification Search
CPC ...... G06F 12/12; G06F 12/10; G06F 12/1009; G06F 12/1018; G06F 12/1063; G06F 12/121–128; G06F 12/08; G06F 12/084; G06F 12/0802; G06F 12/0868; G06F 12/0871; G06F 12/0873; G06F 9/455; G06F 9/45533; G06F 9/45545; G06F 9/45558;
(Continued)

(56) References Cited

U.S. PATENT DOCUMENTS

| 8,505,097 | B1 * | 8/2013 | Juels | G06F 21/552 |
| | | | | 713/183 |
| 8,996,814 | B2 * | 3/2015 | Peinado | G06F 12/126 |
| | | | | 711/133 |

(Continued)

FOREIGN PATENT DOCUMENTS

| KR | 20170049969 A | * | 5/2017 | |
| KR | 20180116971 A | * | 10/2018 | ........... G06F 9/5077 |

OTHER PUBLICATIONS

Zhenghong Wang and Ruby B. Lee, New Cache Designs for Thwarting Software Cache-based Side Channel Attacks, Jun. 2007, ACM, p. 494-505 (Year: 2007).*

(Continued)

*Primary Examiner* — Saleh Najjar
*Assistant Examiner* — Khalid M Almaghayreh
(74) *Attorney, Agent, or Firm* — Robert C. Kowert; Kowert, Hood, Munyon, Rankin & Goetzel, P.C.

(57) ABSTRACT

A computer system and associated methods are disclosed for mitigating side-channel attacks using a shared cache. The computer system includes a host having a main memory and a shared cache. The host executes a virtual machine manager (VMM) that supports a plurality of co-located virtual machines (VMs), which can initiate side-channel attacks using the shared cache. The VMM is configured to maintain respective memory maps for the VMs. The VMM is further configured to determine a subset of current host memory pages for a selected VM that can be used in a side-channel attack, relocate the contents of the current host memory pages to replacement host memory pages in the main memory, and modify the subset of entries to change current host memory pages to the respective replacement host memory pages.

20 Claims, 12 Drawing Sheets

(51) Int. Cl.
*G06F 21/72* (2013.01)
*G06F 21/60* (2013.01)

(52) U.S. Cl.
CPC ...... *H04L 63/1416* (2013.01); *H04L 63/1425* (2013.01); *H04L 63/1466* (2013.01); *G06F 21/60* (2013.01); *G06F 21/72* (2013.01)

(58) Field of Classification Search
CPC ...... G06F 9/544; G06F 9/5066; G06F 9/5077; G06F 21/55; G06F 21/56; G06F 21/06938; G06F 21/06931; H04L 29/06911; H04L 29/06918; H04L 29/6904
USPC ... 713/6, 109, 110, 113, 118, 130, 135, 136, 713/147, 148, 153, 160, 202, 203, 212, 713/221; 718/1, 100, 104; 726/6, 23–25
See application file for complete search history.

(56) References Cited

U.S. PATENT DOCUMENTS

| | | | | |
|---|---|---|---|---|
| 9,009,385 | B1* | 4/2015 | Juels | G06F 3/0622 |
| | | | | 711/130 |
| 10,049,044 | B2* | 8/2018 | Boyer | G06F 12/0806 |
| 2003/0044003 | A1* | 3/2003 | Chari | G06F 21/556 |
| | | | | 380/28 |
| 2008/0005476 | A1* | 1/2008 | Venkatesan | G06F 12/0802 |
| | | | | 711/118 |
| 2008/0022102 | A1* | 1/2008 | Venkatesan | G06F 12/0802 |
| | | | | 713/173 |
| 2008/0109625 | A1* | 5/2008 | Erlingsson | G06F 12/0802 |
| | | | | 711/163 |
| 2010/0180083 | A1* | 7/2010 | Lee | G06F 12/0846 |
| | | | | 711/128 |
| 2010/0332578 | A1* | 12/2010 | Gopal | G06F 7/72 |
| | | | | 708/650 |
| 2012/0324141 | A1* | 12/2012 | Seong | G06F 12/0238 |
| | | | | 711/3 |
| 2013/0007881 | A1* | 1/2013 | Liem | G06F 21/14 |
| | | | | 726/22 |
| 2013/0301826 | A1* | 11/2013 | Gueron | H04L 9/002 |
| | | | | 380/28 |
| 2014/0059688 | A1* | 2/2014 | Margalit | G06F 21/561 |
| | | | | 726/24 |
| 2016/0253259 | A1* | 9/2016 | Jin | G06F 12/1054 |
| | | | | 711/122 |
| 2018/0247069 | A1* | 8/2018 | Tang | G06F 21/52 |
| 2018/0300182 | A1* | 10/2018 | Hwang | G06F 9/45558 |

OTHER PUBLICATIONS

Wang and Lee. "New Cache Designs for Thwarting Software Cache-based side channel attacks" ACM 2007 (Year: 2007).*
Wang and Lee, "New cache designs for thwarting software cache based side channel attacks", 2007, ACM (Year: 2007).*
Mehmet Sinan Inci, et al., "Cache Attacks Enable Bulk Key Recovery on the Cloud," in CHES'16, 2016, pp. 1-21.
Dag Arne Osvik, et al., "Cache Attacks and Countermeasures: the Case of AES (Extended Version)", revised Nov. 20, 2005, CT-RSA'06 Proceedings of the 2006 The Cryptographers' Track at the RSA conference on Topics in Cryptology, pp. 1-25.
Mehmet Sinan Inci, et al., ":Seriously, get off my cloud!; Cross-VM RSA Key Recovery in a Public Cloud," cross-vm rsa key recovery in a public cloud.Cryptology ePrint Archive, Report 2015/898, 2015, pp. 1-15.
Fangfei Liu, et al., "Last-Level Cache Side-Channel Attacks are Practical," 2015 IEEE Symposium on Security and Privacy, pp. 1-18.

* cited by examiner

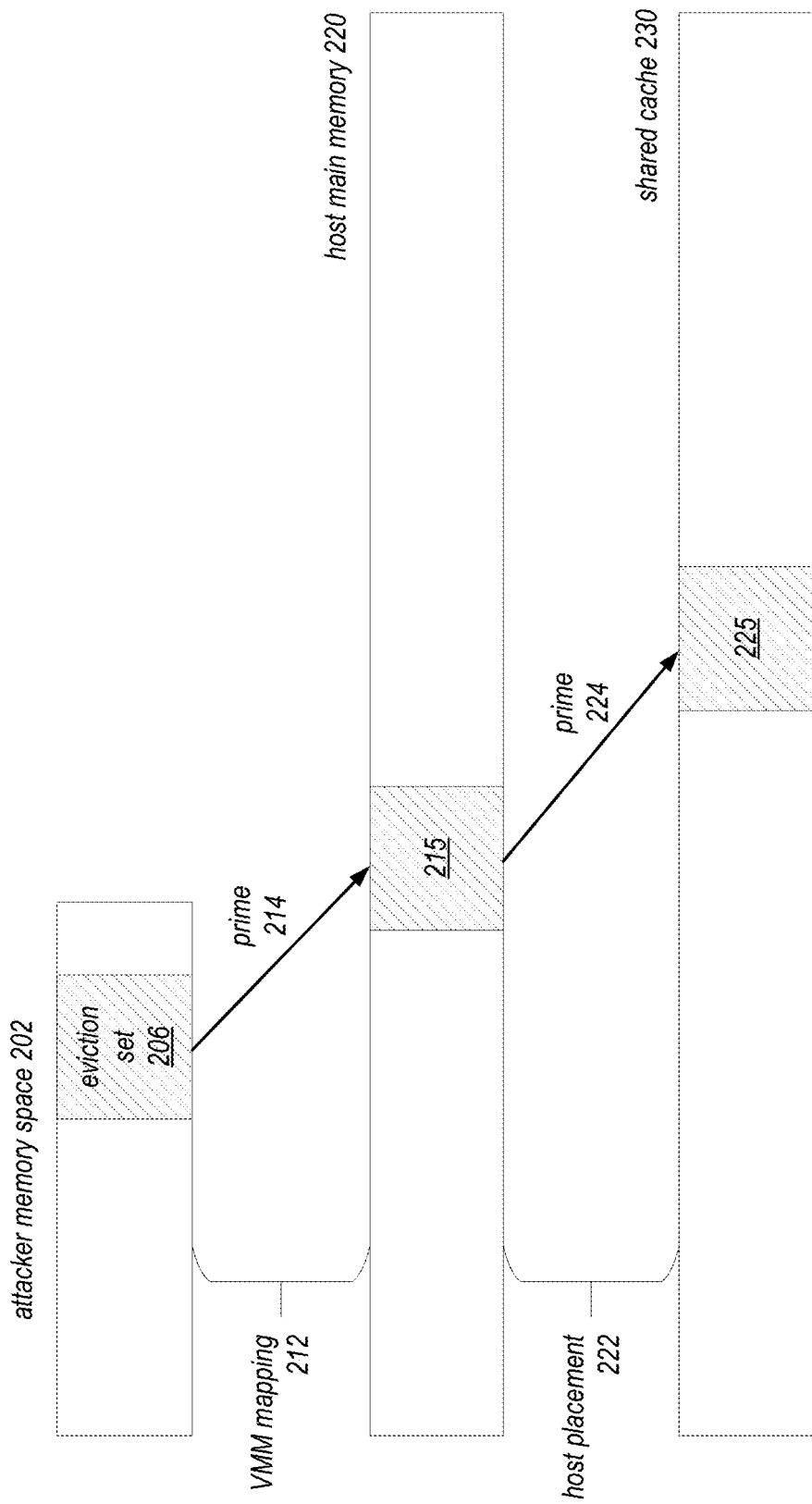

| virtual machine ID 410 | VM page addr 411 | host page addr 412 | cache set index 413 | cache slice ID 414 | recent misses 415 |
|---|---|---|---|---|---|
| 01 | 0004DB00 | 2222DD30 | 408 | 7 | 1 |
| 01 | 0004DB01 | 2222DD31 | 408 | 7 | 50 |
| 01 | 0004DB02 | 2222DD32 | 408 | 7 | 23 |
| 01 | 0004DB03 | 2222DD33 | 408 | 7 | 1 |
| 04 | 0004DB78 | 33777D05 | 930 | 5 | 3 |
| 04 | 0004DB80 | 33871848 | 126 | 3 | 0 |
| 05 | 00099B81 | 3377DD40 | 408 | 7 | 49 |
| 05 | 00099B56 | 3377DD48 | 408 | 7 | 21 |
| 07 | 02AC3B01 | 2754DA38 | 772 | 2 | 0 |
| 07 | 02AC3B04 | 2754DA39 | 772 | 2 | 2 |
| 07 | 02AC3B09 | 30884455 | 353 | 10 | 0 | monitored statistics 450 (columns 413, 414, 415)

FIG. 4A

MITIGATING SIDE-CHANNEL ATTACKS VIA SHARED CACHE

BACKGROUND

Virtualization of hardware has provided numerous benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a service provider and be provided with varying numbers of virtual machine resources on an "as needed" basis or at least on an "as requested" basis.

In some virtualization systems, multiple guest virtual machine (VM) are instantiated on a physical host. These VM instances may be managed using a virtual machine manager (VMM) or hypervisor executing on the host. The VMM presents each virtual machine a sandbox of hardware resources. By design, each guest VM is oblivious to the other guest VMs that are co-located on the same host. Nonetheless, because some hardware resources on the host are necessary shared among the co-located VMs, information leakage may occur across the VMs. In particular, some hosts employ a shared last level cache (LLC) of the central processing unit (CPU). The LLC thus includes cached data for all guest VMs residing on the host. This shared cache may be exploited in a form of "side-channel" attack, in which an attacker VM is able observe the interactions between a victim VM and the shared cache. The manner in which the victim VM uses the cache may reveal confidential information, such as for example encryption keys employed by the victim VM.

A number of strategies have been proposed to defeat this type of attack. However, these strategies generally involve drawbacks. The first approach is to avoid co-location of VM instances entirely. However, this approach is not realistic in view of the extensive sharing of hardware that exists in modern, large-scale virtualization systems. A second approach involves a partitioning of the cache among the different guest VMs, which essentially unshares the cache. However, such partitioning reduces the effective size of the cache and increases wastage. In some systems, cache partitioning is incompatible with the use of larger page sizes, which is often used virtualization systems. Other approaches have been proposed to mask the activities of the victim VM so that useful data cannot be extracted from observations of its cache usage. However, these strategies are only useful to defend against the extraction of a particular type of data; they do not eliminate the shared cache as a potential channel of attack. A practicable defense to the use of the shared cache as a general channel of attack remains a significant challenge.

BRIEF DESCRIPTION OF THE DRAWINGS

FIGS. 2A-2D illustrate the operations of a computer memory system that mitigates side-channel attacks using a shared cache, according to some embodiments.

FIGS. 4A and 4B illustrate views of a page table that is used to mitigate side-channel attacks using a shared cache, according to some embodiments.

Figure 1:
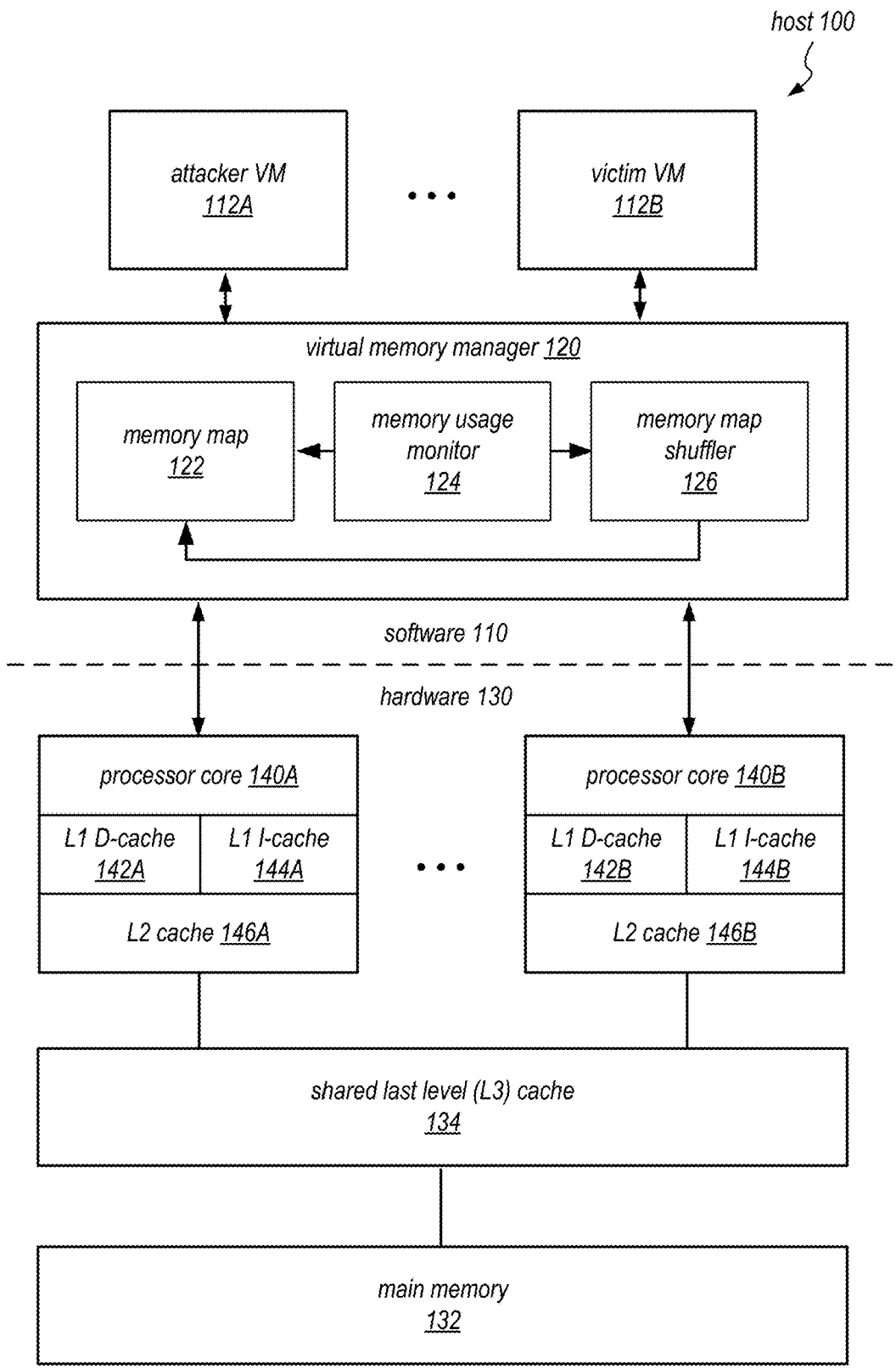
FIG. 1 is a block diagram illustrating an example computer system that mitigates side-channel attacks using a shared cache, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to mitigate side-channel attacks in virtualized computing systems and/or in local systems in which a cache is shared between multiple instances of guest virtual machines (VMs) residing on a host.

The term "side-channel" may refer to a channel of information flow in a computing system that was not intended for the use of processes or applications executing in the system, e.g., a channel of information flow that is not programmed explicitly by the operating system, but that can be opened in some systems in which shared resources are used. For example, in a side-channel attack on a virtualization host, an attacker VM operating on the host may manipulate a cache that is shared between it and a victim VM co-located on the host, such that the attacker VM can observe the cache access of victim VM using the same cache. In that case, the shared cache represents a side channel over which information about the victim VM may be leaked.

A cache may be set-associative, that is, organized as S sets of W lines each. Thus, in an 8-way associative cache, each cache set contains 8 cache lines, which may hold up to 8 memory lines that map to the same cache set. When the cache is accessed, the cache set index field of the memory page address may be used to locate a cache set. The remaining high-order bits are used as a tag for each cache line. After locating the cache set, the tag field of the address is matched against the tag of the W lines in the set to identify if one of the cache lines is a cache hit. As memory is much larger than the cache, more than W memory lines may map to the same cache set, potentially resulting in cache contention. If an access misses in the cache and all lines of the matching set are in use, one cache line must be evicted to free a cache slot for the new cache line. The cache's replacement policy (e.g., last-recently-used) determines the line to evict.

One particular type of side-channel attack that exploits the cache is the so-called prime and probe attack. In a prime and probe attack, an attacker VM first primes the shared cache by filling up certain cache sets in the cache with its own data. The attacker VM then waits for a victim VM to use the lines in these cache sets. After the wait period, the attacker VM probes the cache sets that were primed by accessing the lines in the cache sets. Based on the latency of these accesses, the attacker VM can infer which of its cached lines in the cache set had been replaced, possibly the victim VM. The attacker VM may re-prime the cache set during the probe phase, to prepare for the next round of accesses by the victim VM. In this manner, over time, the attacker VM may observe the memory access behavior of a victim VM, and extract information from this these observed accesses.

For example, in one particular attack, the attacker may extract a key that is used in an encryption algorithm from the observed cache access pattern. For example, the open source encryption software library GnuPG employs a square-and-multiply exponentiation algorithm to carry out the calculation $b^e$ mod m, which is used as the basic encryption and decryption operation in RSA-based encryption systems. In an RSA decryption, the decryption key is the exponent e. The square-and-multiply algorithm carries out the calculation by iterating over the binary digits of the exponent e, performing different operations at each step of the iteration, depending on whether a particular digit of exponent is a 0 or a 1. It has been documented that on some systems, the square-and-multiply algorithm produces a memory access pattern that essentially reveals the digits of the exponent e. A number of other techniques are known to extract other types of information from a program's memory usage patterns.

In order to efficiently carry out the prime and probe attack, the attacker VM must be able to consistently write to particular areas of the cache. This is because the shared cache is often a high-level cache that is very large in size, and thus it is impossible to monitor every cache set in the shared cache using prime and probe. The attacker VM must identify a particular cache set to monitor and then construct an eviction set that is consistently mapped to that cache set. This eviction set is then used to repeatedly prime and probe the targeted cache set in the shared cache.

This difficulty has been overcome in some systems through a combination of techniques and circumstances. For example, the attacker can control what host physical pages are allocated to it by requesting blocks of contiguous pages. Moreover, in many virtualization systems, the VMM is configured to provide pages of memory to the VMs that are larger than the standard page. Use of larger pages provide a number of benefits these systems, including for example, a reduction in the number of entries that must be stored in the translation lookaside buffer (TLB) for the cache. However, use of larger pages also means that more bits of the host page address are visible to (and controllable by) the attacker. In addition, for some hardware platforms, the placement function that maps host physical addresses to cache locations have been successfully reverse engineered. The attacker may thus use knowledge of the placement function to select host physical addresses to target particular locations in the shared cache. For example, some host systems in the INTEL™ XEON™ family of hosts uses a sliced LLC, in which the LLC is divided into N slices. Each unique location in the sliced LLC requires a slice identifier, which is generated from a undocumented hash function applied to the bits of the host physical address. The hash function has since been fully reverse engineered, and attackers can use this knowledge to construct eviction sets.

To disrupt the prime and probe attack and other forms of cache-based attacks that exploit the shared cache, the disclosure describes a system that automatically changes the memory mapping between the VM memory pages to the host memory pages, in a shuffling operation. In some embodiments, these mappings may be store as a set of page tables that are maintained by the VMM. The VMM may occasionally change the underlying host memory pages that are allocated to the VM memory pages, so that an attacker VM or a victim VM will not use the same location in the shared cache. The contents of the host memory pages may then be moved to their new respective locations in the host's main memory. The shuffling may occur periodically, at random times, or upon the detection of certain conditions. For example, the VMM may monitor the eviction rate of memory pages used by the VMs in the shared cache. Pages that are being evicted frequently may be targeted to be moved. As another example, the VMM may monitor the memory usage of the VMs to identify suspected attacker VMs or victim VMs, and shuffle the memory pages of these VMs more frequently and/or extensively. In some embodiments, the shuffler may shuffle the memory mapping in a way that ensures the old and the new host memory pages and map to different locations in the shared cache, such as a different cache set or slice. Thus, any side-channel attacks that may be implemented or planned on the host are disrupted.

These and other features and benefits of the inventive system and method are described in more detail below, in connections with the figures. It is noted that while the disclosure is presented primarily in the context of one form of side-channel attack (the prime and probe attack), the inventive method is broadly applicable to mitigate other types of attacks. Specifically, the inventive method may be used to disrupt any attack that depends on the ability of an attacking guest to consistently write to particular locations in a host's cache. A person of ordinary skill in the art would appreciate that the inventive system and method described herein may be used in thwarting a wide variety of attacks.

FIG. 1 is a block diagram illustrating an example computer system that mitigates side-channel attacks using a shared cache, according to some embodiments. The system may include a host 100, which includes software 110 that executes on hardware 130.

The hardware 130 may include a multi-core processor that comprises multiple processor cores 140A, 140B, etc. These process cores may act as separate instruction processing units. The cores may process instructions concurrently, thus increasing the overall speed of the combined processing unit. In some embodiments, processor cores 140A and 140B may reside on a single integrated circuit or chip.

The hardware 130 may also include a main memory 132, which may be the main runtime memory of the host, and is addressable by the CPU. The main memory 132 may be a form of volatile memory such as dynamic random-access memory (DRAM) or static random-access memory (SRAM). In some embodiments, the main memory 132 may be located on a different chip or device from the CPU chip. The host 100 may execute an operating system that manages the main memory 132 for programs executing on the host 100. When a program needs memory, it may request memory from the operating system, in units called frames or pages.

The hardware 130 may include a shared last level cache (LLC) 134. The LLC 134 may act as a cache on the main memory 132, which is smaller than the main memory 132, but faster to access. In some embodiments, the LLC 134 is located on the CPU chip. As depicted, the LLC 134 is a level 3 (L3) cache, which may represent the highest level of the CPU cache hierarchy. As shown, the LLC 134 is shared by all processor cores 140A, 140B, etc. This sharing may be implemented using a fast communication interface on the CPU chip. However, accessing the LLC 134 is still slower than accessing lower levels of the cache hierarchy that are local to the individual processor cores 140. In some embodiments, the LLC 134 is an inclusive cache, meaning that it contains all cache entries of lower levels of cache in the CPU cache hierarchy, including the L1 D-cache 142, the L1 I-cache 144, and the L2 cache 146.

As depicted, each processor core 140 may have its own local cache, which may include an L1 D-cache 142, an L1 I-cache 144, and an L2 cache 146. The L1 D-cache 142 may be a data cache to speed up data fetch and store, and the L1 I-cache 144 may be an instruction cache to speed up executable instruction fetch. The L2 cache 144 is not split and into an instruction cache and a data cache. The L2 cache 146 may be larger than the L1 cache, but slow to access than the L1 cache.

In operation, data is transferred between the main memory 132 and cache hierarchy in blocks of fixed size, called cache lines or cache blocks. When a cache line is copied from the main memory 132 into the cache, a cache entry is created. The cache entry will include the copied data as well as the requested main memory location, called a tag. When the processor 140 needs to read or write a location in main memory, a memory management unit (MMU) first checks for a corresponding entry in a lower level of cache. If the requested memory location is in the lower level, a cache hit has occurred, and the processor simply reads or writes the data in the cache line. However, if the processor does not find the memory location in the lower level, the processor 140 proceeds up to the next level of the cache hierarchy, and so on, until an entry is found. If the memory location is not found at any level in the cache hierarchy, a cache miss has occurred. In that case, a new cache entry is allocated and data from the main memory 132 is copied into the cache hierarchy, then the request is fulfilled from the contents of the cache. Because the slower main memory 132 is accessed during a cache miss, the processor 140 will experience a significant added latency for a memory access that generates a cache miss. The precise details of CPU cache management will be different based on the hardware platform.

In some embodiments, the processors may use a slicing scheme for its last level cache (LLC). For example, a multi-processor from the INTEL™ XEON™ family of processors, such as the E5-2670 processor, may implement a sliced cache. That is, the shared cache may be built up of multiple independent slices. Physical addresses in the main memory are mapped across the slices using a hash function with cache line granularity. In some embodiments, the hash function ensures that consecutive cache lines will be mapped to different cache slices. The hash function may be used to spread the traffic approximately evenly across the slices no matter what the access pattern, thus allowing for parallel writes to the cache and increasing bandwidth. In some embodiments, the LLC is shared among all processor cores on the CPU chip via a ring bus.

However, the LLC may be divided into per-core slices that can be more quickly accessed by its closest associated core. To uniformly distribute memory traffic to the slices, INTEL™ uses a carefully-designed but undocumented hash function to map the memory address into a slice ID. Within a slice, the set is accessed as in a traditional cache, so a cache set in the LLC is uniquely identified by the slice ID and cache set index.

The slicing of the LLC creates an addition difficulty for a side-channel attack. In particular, to efficiently carry out the attack, an attacker must predict which slice a memory page will be mapped to in the LLC. On a host with a 10-core processor, a main memory page may be mapped to 10 different locations in the LLC. This problem is overcome in two ways. First, the attacker may simply repeatedly load pages that are known to have the same cache set index, but potentially different slice IDs. The attacker may then check if two loaded cache sets collide with each other in the LLC, by monitoring the latency of the accesses. Using this trial and error approach, the attacker may eventually be able to occupy a cache set with the same set index in all 10 LLC slices. Second, the hash function that is used to generate the slice ID has recently be reverse engineered. The hash function hashes certain bits in the host memory page address to produce a slice ID. However, not all of these bits are visible to a guest VM. Nonetheless, the reverse engineered hash function may give the attacker sufficient knowledge to generate page addresses that will map to all the LLC slices by manipulating only a few bits of the page address.

The software 110 of the host 100 may comprise a virtual memory manager 120 that supports one or more virtual machines instances 112A, 112B, etc. One of the VMs may be an attacker VM 112A that is configured to carry out a side-channel attack against one or more victim VMs 112B.

The VMM 120 may include one or more modules capable of instantiating and managing the different VMs 112. The VMM 120 may include, for example, a hypervisor and an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

A VM 112 may comprise one or more compute instances with a specified computational capacity (which may be specified by indicating the type and number of CPUs, the main memory size, and so on) and a specified software stack (e.g., a particular version of an operating system, which may in turn run on top of a hypervisor). One or more different computing devices may be used singly or in combination to implement the instances on the virtualization host. The computing devices may include general purpose or special purpose computers, storage devices, network devices and the like. The instances may operate or implement a variety of different platforms, such as application server instances, JAVA™ virtual machines (JVMs), general purpose or special-purpose operating systems, platforms that support various interpreted or compiled programming languages such as RUBY, PERL, PYTHON, C, C++ and the like, or high-performance computing platforms) suitable for performing client applications. Different instances may have different numbers of virtual CPU cores, and different amounts of memory, cache, storage and/or networking capacity, as well as any other performance characteristic. Configurations of instances may include their location, in a particular data center, availability zone, geographic, location, etc., and (in the case of reserved compute instances) reservation term length.

The VMs 112 may be instantiated to provide a variety of services that allows clients to use computing resources in a service provider network. These VMs 112 can, for example, provide access to generic compute instances. The service provider network can also provide access to specialized compute instances with specialized functionality, such as routers, domain name systems (DNSs), load balancers, desktop virtualization servers, and the like. The service provider network may include various types of storage services that expose different types of storage access interfaces, including block-based storage services, relational database services, NoSQL database services, file system services, and the like. The service provider network may also include services that provide functionalities of commonly used software modules, which can be used in conjunction with other software to implement larger systems. For example, provided services may include queuing services, notification services, logging services, key storage and management services, and the like. The provided services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services may operate on computing resources of the service provider network, and may be controlled and configured by clients via various interfaces such as graphical user interface (GUI) (e.g., as part of an administration control panel or web site) and/or as a programmatic interface such as an Application Programming Interface (API). As the services operate on the service provider's computing resources, usage or performance metrics data may be generated and captured.

The VMM 120 may maintain a number memory maps 122 for the VMs 112. In some embodiments, the memory maps 122 may comprise a number of shadow page tables that are maintained for the VMs 112. Each VM 112 may execute an instance of a guest operating system (OS) to support the programs running on the VM. As the VM 112 runs, the guest OS may maintain page tables that maps guest virtual pages used by the programs to guest physical pages, which are pages of the VM's "physical" memory that are emulated based on actual physical memory of the host 100. Every time a program requests a memory page from the guest OS, an entry is inserted to the guest OS page tables that translates the guest virtual page as seen by the program to the VM "physical" page. This insertion to the guest OS page tables may also trigger an insertion into the shadow page tables maintained by the VMM 120. The shadow page tables contain entries that associate the emulated "physical" pages used by the VMs 112 and the actual physical pages of the host 100 that are allocated to the VMM 120. The VMM 120 thus manages the allocation of host memory to support the VMs 112.

In some embodiments, the VMM 120 may include a memory usage monitor 124. The memory usage monitor 124 may be configured to monitor certain statistics or metrics associated with the VMs' usage of the physical memory of the host 100. Some of the monitored metrics may be obtained from the VMs 112 above the VMM 120. For example, the memory usage monitor 124 may track the number, volume, and/or timing of page requests for the VMs 112. Some of the monitored metrics may come from the underlying operating system of the host 100. For example, the VMM 120 may receive indications from the host operating system regarding whether a memory request constitutes a cache hit or a cache miss. Moreover, the memory usage monitor 124 may compute certain additional metrics or results from the collected metrics. For example, from the number of cache hits and cache misses provided by host OS, the memory usage monitor 124 may compute a hit or miss rate over a period of time. These metrics may all be saved in data structures that are maintained by the memory usage monitor 124. In some embodiments, the saved metrics may be stored in the expanded shadow tables of the VMM 120.

The monitored metrics may be used by the memory usage monitor 124 to detect potential side-channel attacks and trigger certain corrective actions. In some cases, detected conditions may cause VMM 120 to initiate a shuffling operating, which changes the mapping of some of the VM memory pages to the host memory pages. As explained further below, such a shuffling of the memory map 122 will disrupt a potential attacker VM's understanding and monitoring of the shared cache 134, thus thwarting any potential side-channel attacks using the shared cache.

The memory usage monitor 124 may be configured to trigger actions other than a shuffling of the memory map 122. For example, in some cases, the memory usage monitor 124 may detect a particularly dangerous attack or critical situation, and in response, cause a suspected attacker VM 112A to be shutdown. In some cases, an alert may be generated to an administrator of the host 100, and a log of the memory access history and state of the attacker VM 112A may be saved for further analysis.

In some embodiments, the memory usage monitor 124 may be programmed to recognize an attacker VM 112A or a victim VM 112B, based on the monitored metrics data. For example, the memory usage monitor 124 may determine that a VM 112 that is repeatedly refreshing all cache lines in a cache set may be an attacker VM 112A that is attempting or in the process of carrying out a prime and probe attack. Similarly, the memory usage monitor 124 may determine that another VM 112 whose cache lines are repeatedly being evicted by a suspected attacker VM may be a victim VM 112B. In some embodiments, memory usage monitor 124 may generally monitor the miss rates of all of the host memory pages used by the VMs 112, and perform additional analysis on those pages whose miss rate exceed a set threshold. When an attacker VM 112A or victim VM 112B is detected, the memory usage monitor 124 may trigger a shuffling operation that is targeted to the memory pages of those particular VMs. In some cases, the memory usage monitor 124 may prefer to always shuffle the memory pages of a suspected attacker VM 112A, because it is deemed to be a malicious actor and the VM that is causing the cache collisions. However, in other cases, the memory usage monitor 124 may elect to shuffle the memory pages of a victim VM 112B. This may be done to for example protect a highly sensitive VM whose data access operations must be kept hidden from other co-located VMs.

In some embodiments, the behavior of the memory usage monitor 124 may be configurable by the host administrator. For example, the memory usage monitor 124 may be updated from time to time to watch for particular memory access patterns of known attacks. In some embodiments, the memory usage monitor 124 may be configured to generally protect the host 100 by periodically and randomly triggering memory map shuffles. For example, the memory usage monitor 124 may simply ranking the pages used by the VMs 112 based on a recent cache miss rate, and periodically reshuffle the pages with the most number of cache misses. This process not only protects the VMs from side-channel attacks, but also ensures that cache contention is kept to a low level.

In some embodiments, the VMM 120 may implement a memory map shuffler 126. The memory map shuffler 126 may be configured to implement a shuffle operation that changes the host memory page that is mapped to a VM memory page in the memory map 122. The shuffle operation may be triggered by detected condition by the memory usage monitor 124, or simply be performed periodically as part of the routine operation of the VMM 120. In conjunction with a modification of the memory map 122, the memory map shuffler 126 may also move the contents of the old host memory page to be moved to a new host memory page in the host's main memory 132. In some embodiments, the memory map shuffler 126 may explicitly load the new host memory page, so that it is cached in the hardware cache hierarchy of the host 100. In this way, move of the host memory page may be invisible to the VM 112. In some embodiments, prior to altering the memory map 122 or moving the contents of the host memory pages, the memory map shuffler 126 may mark associated VM memory page to be read-only, so that no writes to the memory page are lost. The memory map shuffler 126 may implement shuffle operation as an atomic operation that cannot be interrupted by processes on the VM 112.

In some embodiments, the memory map shuffler 126 may select the new host memory pages based on the pages' address. For example, the memory map shuffler 126 may select new host memory page that has a different cache set index or hashes to a different slice of the shared cache 134. As another example, the memory map shuffler 126 may select a new host memory page that has the least number of cache collisions with the host memory pages that are current in use by the VMs 112. In some embodiments, the VMM 120 may allocate a pool of host memory pages from the host OS and allow the memory map shuffler 126 select new host memory pages from the pool during the shuffling operation. In some cases, the memory map shuffler 126 may simply swap the contents of two host memory pages during the shuffling operation.

Depending on the triggering cause of the shuffling operation, the memory map shuffler 126 may be request to carry out different types of shuffling operations. In some cases, the memory map shuffler 126 may be requested to shuffle a particular set of pages. The memory map shuffler 126 may be requested to shuffle the memory pages at least partly in a pseudo random fashion, so that the process is not reproducible by an attacker. In some cases, the memory map shuffler 126 may be requested to shuffle the memory pages such that they are mapped to a new host memory page that will be cached at a different location in the shared cache 134. In some cases, the memory map shuffler 126 may be requested to shuffle the memory pages of a particular VM 112, which may be an attacker VM 112A or a victim VM 112B. The memory map shuffler 126 may be requested to isolate or quarantine particular memory pages, such that they are moved to host memory pages in a particular cache set, or a particular cache slice. The memory map shuffler 126 be requested to select new host memory pages such that they have no or only limited number of cache collisions with the other host memory pages used by the VMs 112. In some cases, the memory map shuffler 126 may be requested to continuously shuffle particular pages at pseudo random intervals of time. The intervals may set such that they are shorter than the minimum time that is required to carry out particular steps in known side-channel attacks. By shuffling the memory pages only at certain times, as opposed to all the time, the shuffling strategy is more protected from attack.

Depending on the implementation, the memory usage monitor 124 and memory map shuffler 126 may execute as an integrated part of the VMM 120, or as separate processes on the host OS. Moreover, the memory usage monitor 124 and memory map shuffler 126 may be used to protect their own metadata. For example, the memory usage monitor 124 and memory map shuffler 126 may monitor the cache miss rate of its own host memory pages, and/or occasionally shuffle its own memory pages. These measures may add another layer of protection to prevent its own security-critical activities from being observed and attacked.

Figure 2B:
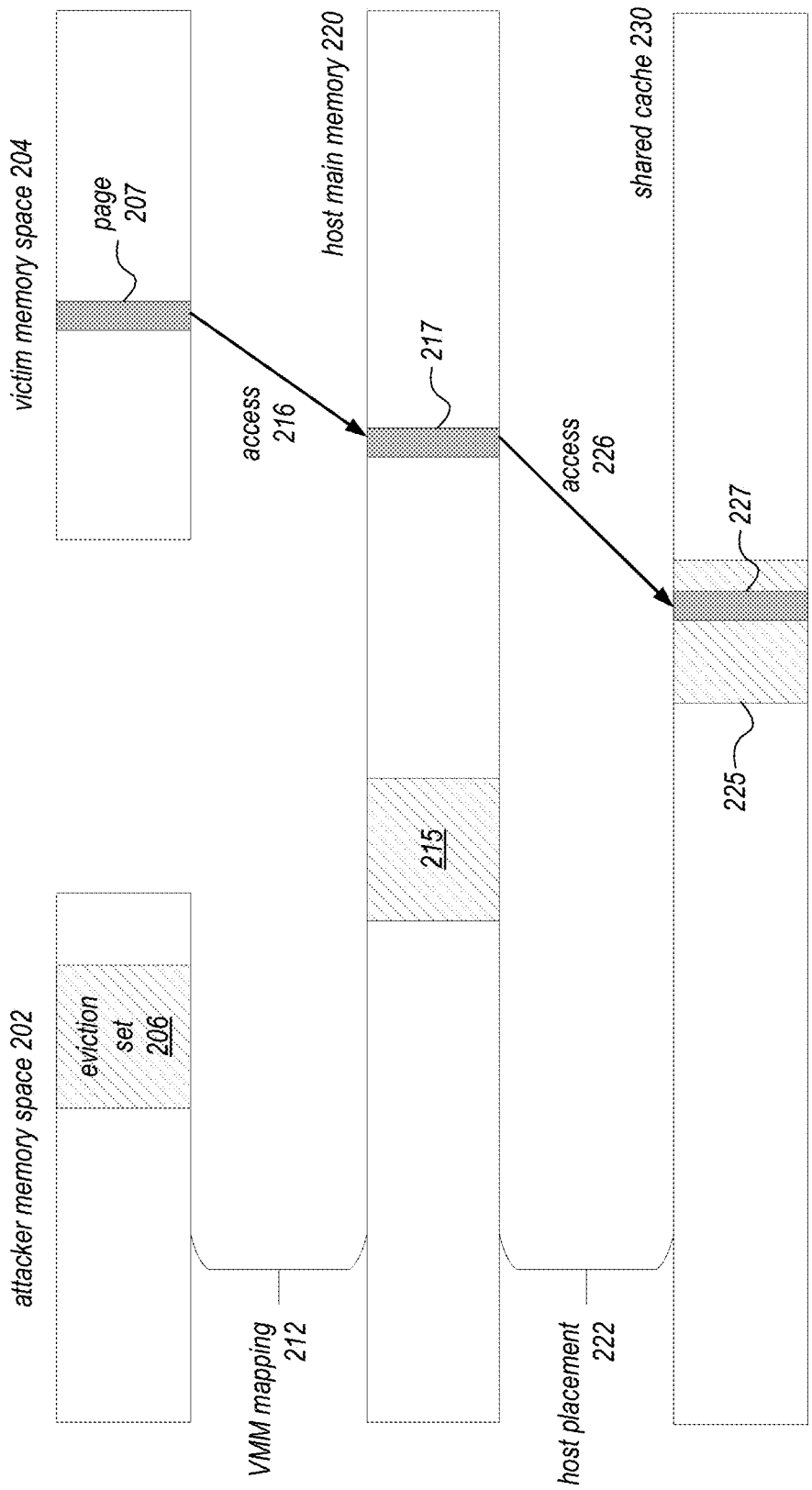
Figure 2C:
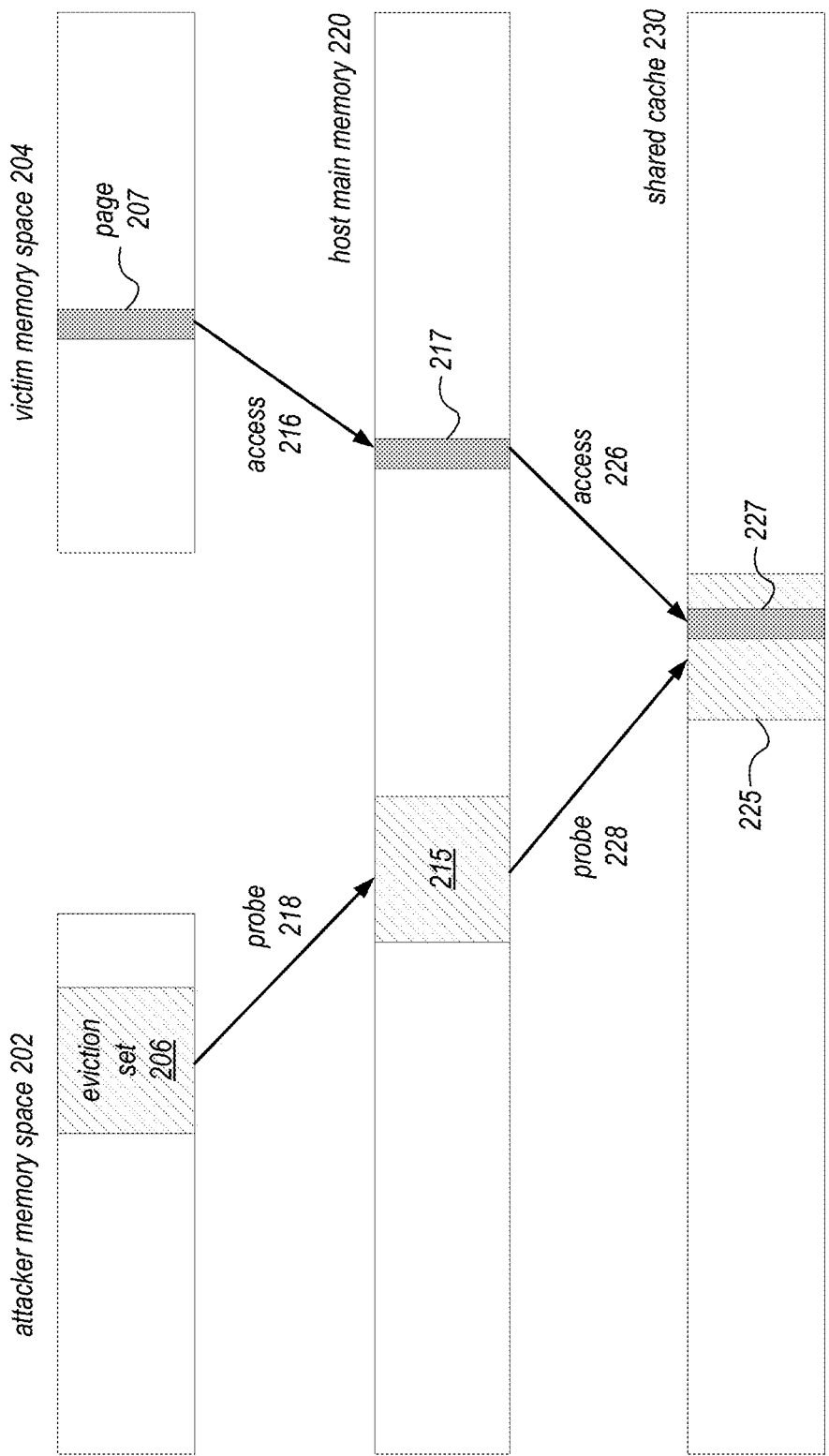
Figure 2D:
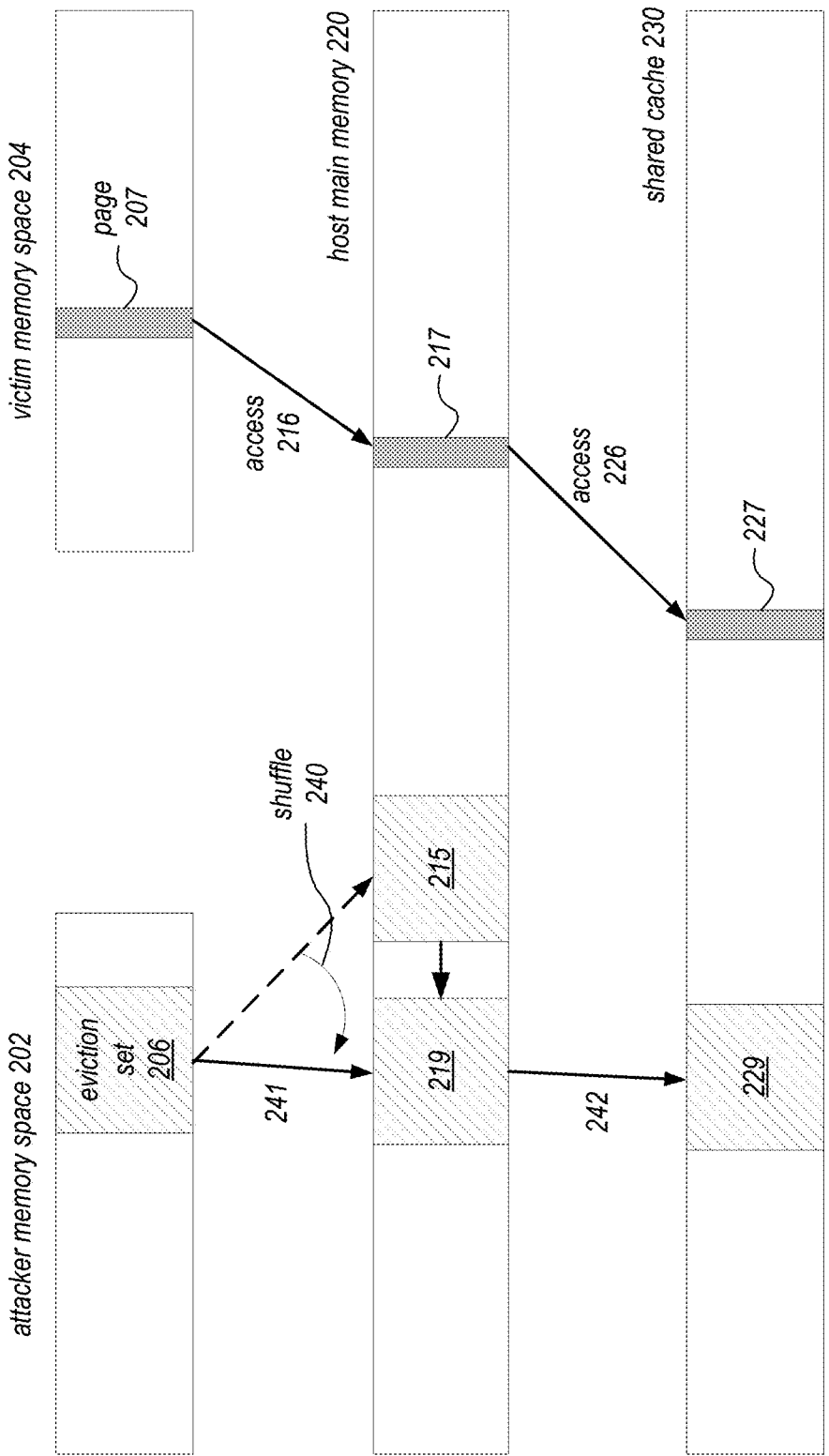

FIGS. 2A-2D illustrate the operations of a computer memory system that mitigates side-channel attacks using a shared cache, according to some embodiments. FIGS. 2A-2C illustrate stages in an example prime and probe attack by an attacker VM, and FIG. 2D illustrates a shuffle operation that thwarts the attack.

FIG. 2A depicts the prime stage of the exemplary prime and probe attack. FIG. 2A shows three level of memory that are maintained in the host. The attacker memory space 202 is the area of memory that is used by the attacker and fully addressable by the attacker. Attacker memory space 202 may be for example the process memory that is allocated to the attacker process in the attacker VM by the VM operating system. As discussed, the attacker may use its knowledge of the host environment to construct an eviction set 206 in its own memory space 202, such that the eviction set 206 will be cached at a known cache location 225 in the 230.

As depicted, the eviction set 206 is first mapped to a location 215 in the host's main memory 220. In most VM operating systems and most VMMs, the lowest bits of the memory address remain invariant from the VM virtual memory to the VM physical memory to the host physical memory, and the higher bits of the address are changed during the mappings by a constant function. In particular, most VMMs generally maps a continuous block of host physical memory to a continuous block of VM physical memory. These mappings are stored in the VM mapping 212, which in some systems are referred to as shadow page tables.

During the prime stage, the attacker carries out a prime step 214 and 224, which fills up a cache set 225 in the shared cache 230. The eviction set 206 may be comprised simply of dummy data. But the eviction set 206 allows the attacker to occupy a cache set 225, so it may observe any activity of another VM in that cache set, which will cause one of the attacker's cache lines to be evicted. Cache placement in the shared cache 230 is determined by a host placement function 222. Notably, on some systems, such as INTEL™ XEON™ processor systems, cache placement (i.e., the cache set index) is determined by a set of bits of the host physical address, which, for larger memory pages, is within the range of page offset bits that are visible to the attacker. Accordingly, the attack will be able to create an eviction set 206 that maps exactly to a single cache set 225.

FIG. 2B depicts a wait stage of the exemplary prime and probe attack. During this stage, the attacker may sit idle, while a victim access the shared cache 230. For example, a victim VM may access a page 207 in its own memory space 204. The memory page 207 will be mapped according to the same mappings as the attacker eviction set 206, through the host main memory 220 and shared cache 230. The access may cause page 207 to be cached in the primed cache set 225 occupied by the attacker, and cause a line in the cache set 225 to be evicted out of the cache. The attacker may wait a pre-configured time interview for one or more victims to access the cache.

In practice, the attacker may have spent some time on the host examining each cache set in the shared cache 230 for potentially interesting memory access patterns, for example accesses indicating an encryption or decryption operation. Because guest VMs may continue to execute on a host for a long time without changing the set of memory pages that they are using, the attacker VM may detect particular locations in the cache that will repeatedly exhibit interesting memory access patterns, and the attacker can focus its prime and probe attack on these particular locations.

FIG. 2C depicts a probe stage of the exemplary prime and probe attack. During the probe stage, the attacker resumes execution and measures the time to load the data in its eviction set 206 in the shared cache 230. If the victim has accessed 226 some of the primed cache sets 225, it will have evicted some of the attacker's cached lines, which the attack observes as an increased memory access latency for those lines. Accordingly, the attacker is able to see the victim's memory accesses. As the probe phase access the cache, it may also double as a prime phase for subsequent observations.

FIG. 2D depicts an exemplary shuffle operation that is used to thwart the prime and probe attack. As depicted, the attacker's memory pages may be shuffled 240 in the VMM memory mapping 212, such that the attacker's eviction set 206 is backed by a different set of physical pages 219 in the host's main memory 220. The shuffle operation 240 may comprise a change in the VMM memory map 212, along with a move of the attacker's memory pages in the main memory 220. As a result of the shuffle, the attacker's eviction set 206 may be moved to a different cache set 229 in the shared cache 230, which no longer collides with the victim's memory page 227. Thus, the attacker is no longer able to observe the victim's memory accesses.

The shuffle operation 240 may be carried out in a way that is undetectable to the attacker. For example, the shuffle may take place during an idle stage of the attacker, where the attacker is not actively accessing its eviction set. In some embodiments, the move of the attacker's pages 215 in the main memory 220 may occur instantaneously. This may be accomplished by first copying the contents of the pages 215 to a new set of pages 219 in the main memory 220, and then making a single atomic change in the VMM memory mapping 212. In some embodiments, the attacker's memory pages 206 may be temporarily marked read-only, while the shuffle operation occurs. In some embodiments, the attacker's memory pages may simply be invalidated in the shared cache 230.

Although FIG. 2D depicts a situation where the attacker's pages are shuffled, in some embodiments, the pages of the victim may be shuffled. As discussed, a memory usage monitor 124 may be configured to monitor the memory usages of the VMs, and the module may be configured to detect a likely attack, and the likely attacker or victim. In that case, the shuffle 240 may comprise a change to all or some portion of the memory pages held by the attacker or the victim. For example, the memory usage monitor 124 may determine all likely eviction sets 206 of an attacker, and shuffle the eviction sets.

The memory usage monitor 124 may cause the shuffling 240 to occur repeatedly, in some cases at pseudorandom time intervals. The time intervals may be set such that they are shorter than the time required to carry out a particular step of a known side-channel attack. The memory usage monitor 124 may monitor for particular conditions indicating a side-channel attack. In some embodiments, the memory usage monitor 124 may monitor the memory access pattern of the VMs. In some embodiments, the memory usage monitor 124 may observe the miss rate of the VM's memory pages in the shared cache 230.

In some embodiments, the shuffle 240 may relocate a VM's memory pages to a new location in the main memory 220 that would not cause contention in the cache. For example, the shuffle 240 may select a host memory address that will map to a different cache set or slice in the shared cache 230. In some embodiments, the shuffle 240 may choose a host memory address that is designated to be a quarantined or private location for a particular VM. In this way, the shared cache 230 is effectively unshared for that particular VM.

Figure 3A:
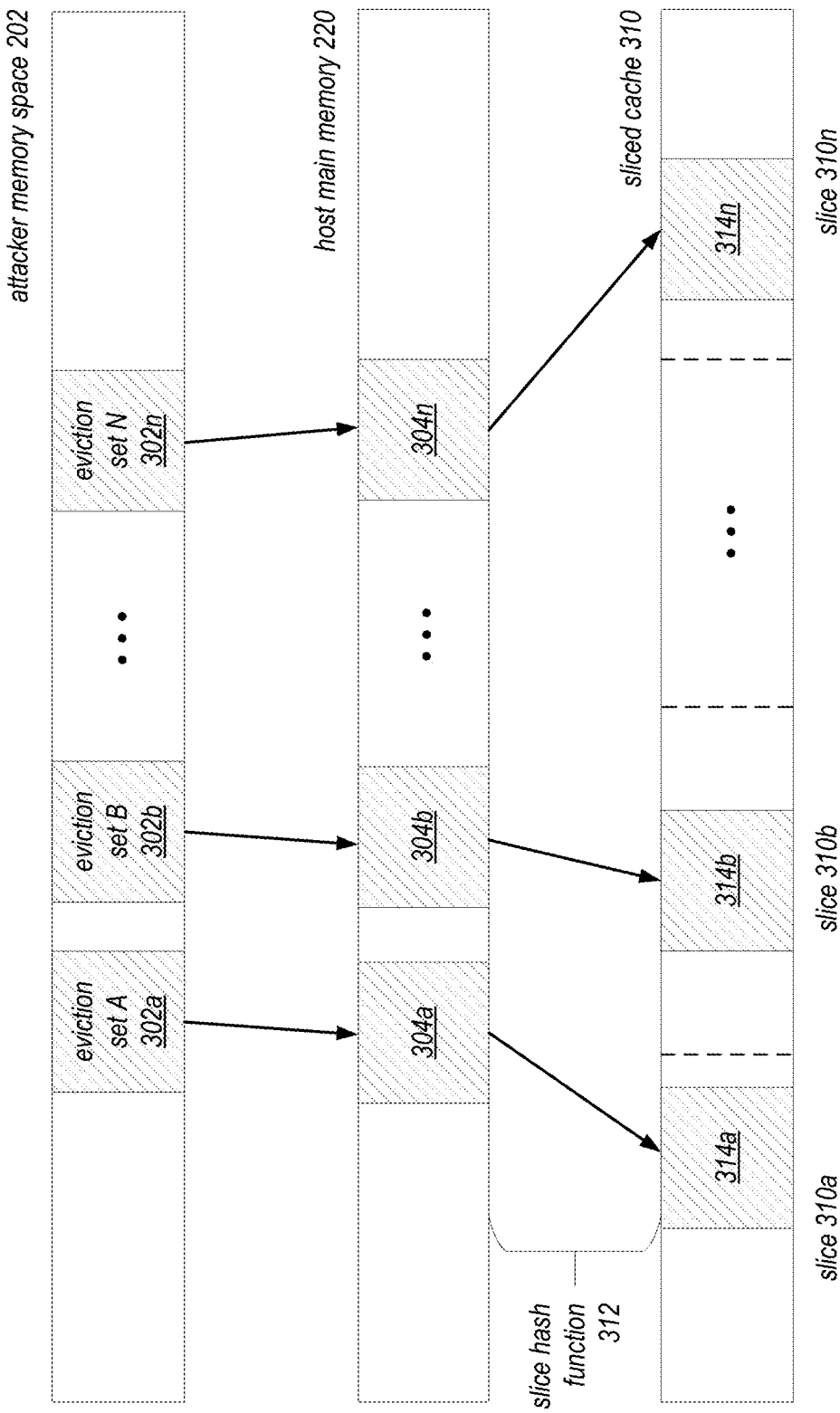
FIGS. 3A and 3B illustrate the operations of a computer memory system that mitigates side-channel attacks using a shared cache that is sliced, according to some embodiments.
Figure 3B:
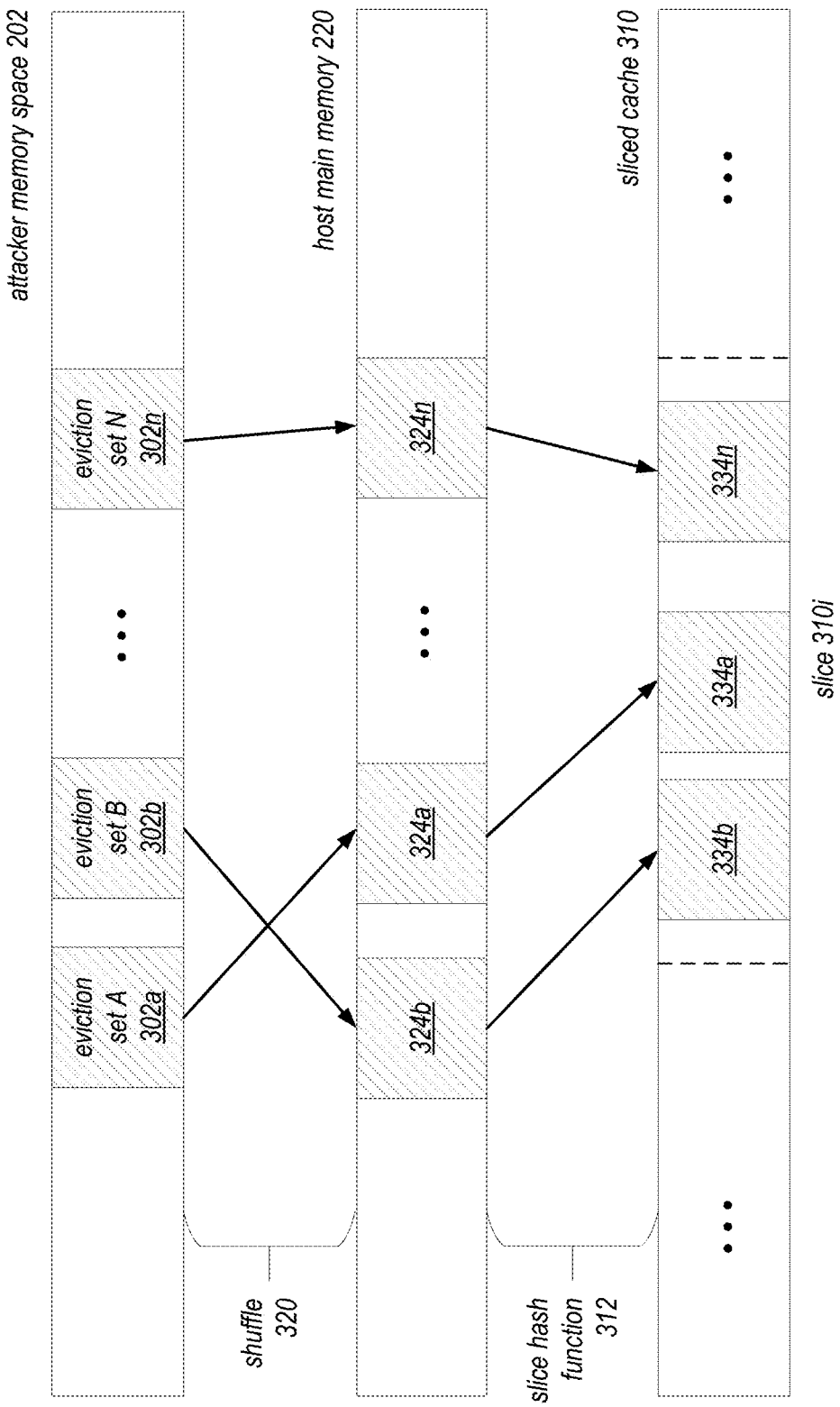

FIGS. 3A and 3B illustrate the operations of a computer memory system that mitigates side-channel attacks using a shared cache that is sliced, according to some embodiments. FIG. 3A depicts one manner in which a side-channel attack may be implemented in a sliced cache system. As discussed, in some systems, such as servers that employ the INTEL™ XEON™ family of processors, a slicing scheme is used for the last level cache. The LLC is shared among all processor cores on the CPU chip via a ring bus. However, the LLC is divided into per-core slices that can be more quickly accessed by its associated core. To uniformly distribute memory traffic to the slices, INTEL™ uses an undocumented hash function 312 to map the memory address into a slice ID. A cache set in the LLC is uniquely identified by the slice ID and cache set index.

The slicing of the shared cache 310 presents a difficulty for the attacker, as the hash function that maps main memory 220 locations to locations in the cache is undocumented. Moreover, hash function 312 may operate over higher bits in the main memory address, so that an attacker operating on a VM cannot see or control all of the bits that are required to generate the slice ID. This problem has been general overcome in two ways. First, the hash function 312 that maps main memory addresses to the slice ID can be reverse engineered. In fact, the slice ID hash function for the INTEL™ XEON™ processors that use the LLC slicing has been reversed engineered and published. Second, the attacker may determine which of its VM memory pages occupy which slices in the shared cache 310 by empirically allocating memory pages that are cached. For example, an attacker may repeatedly request memory pages that are known to map to the same cache set, and check if these pages collide with each other in the shared cache 310. A detected collision means that two pages were cached in the same slice. Using this technique, the attack may eventually construct eviction sets that occupy entire cache sets on each cache slice. The process may be sped up given some knowledge of the hash function 312. For example, it may be inferred from the reverse-engineered hash function 312 that if one VM page falls on slice 1, a particular set of changes in the VM page address would correspond a second VM page that would fall on slice 2. In some cases, having knowledge of the reversed-engineered hash function 312 would narrow the number of possible slices that a given VM page may fall on, thus reducing the amount of work that the attacker must perform to empirically determine an eviction set.

With the aid of these techniques, an attack may be able to occupy full cache sets on each of the slices of the shared cache 310. As shown in FIG. 3A, in one case, an attacker may create and maintain a set of eviction sets 302a to 302n that maps to cache sets 314a to 314n on the different slices 310a to 310n. The cache sets 314a to 314n may all have the same cache set index. This configuration may be useful in situations where the victim will consistently use memory pages that map to a given cache set index, but with varying cache slice IDs.

FIG. 3B illustrates a shuffle 320 that changes the main memory 200 pages that back the eviction sets 302a to 302n constructed by the attacker. In the illustrated example, a shuffler, for example memory map shuffler 126, may shuffle the memory pages such that the backing main memory pages 324a to 324n all map to a single slice 310i in the shared cache 310. For example, a memory usage monitor 124 may employ this strategy of shuffling for a suspected attacker VM. Once an attacker VM is detected, the memory map shuffler 126 may modify the memory mappings so that all main memory pages backing the eviction sets 302a to 302n of the attacker will be cached to a particular slice 310i. The memory map shuffler 126 may accomplish this by using knowledge of the reversed engineered function 312. The memory map shuffler 126 may be able to see and control all of the bits of the host memory address, thus allowing the module to fully control which cache slice a given VM memory page will reside on. For example, the memory map shuffler 126 may have access to a pool of main memory pages allocated to the VMM, and select only main memory pages from the pool that fall on a particular cache slice. In this manner, the memory map shuffler 126 may quarantine all memory pages of an attacker VM to a single slice in the cache, thus effectively unsharing the cache 310 for that VM and protecting the rest of the VMs from the attacker VM.

A similar strategy may be used to quarantine some or all of the pages of a potential victim VM. For example, a VMM 120 may expose a feature to allow an admin to limit some or all memory pages of a VM to an isolated cache slice. For example, this protection may be provided to VMs that are performing security-critical tasks. Such quarantining may also be implemented based on cache sets, instead of cache slices. Thus, for example, in some embodiments, the VMM 120 may segregate the shared cache 310 into a number of isolated cache sets. The VMM 120 may construct these isolated cache sets automatically, based on monitored metrics or statistics of the VMs, or via configuration settings specified by an administrator. Accordingly, the memory pages of an attacker VM or a victim VM may be assigned to a handful of cache sets that are not shared with other VMs on the host.

Figure 4B:
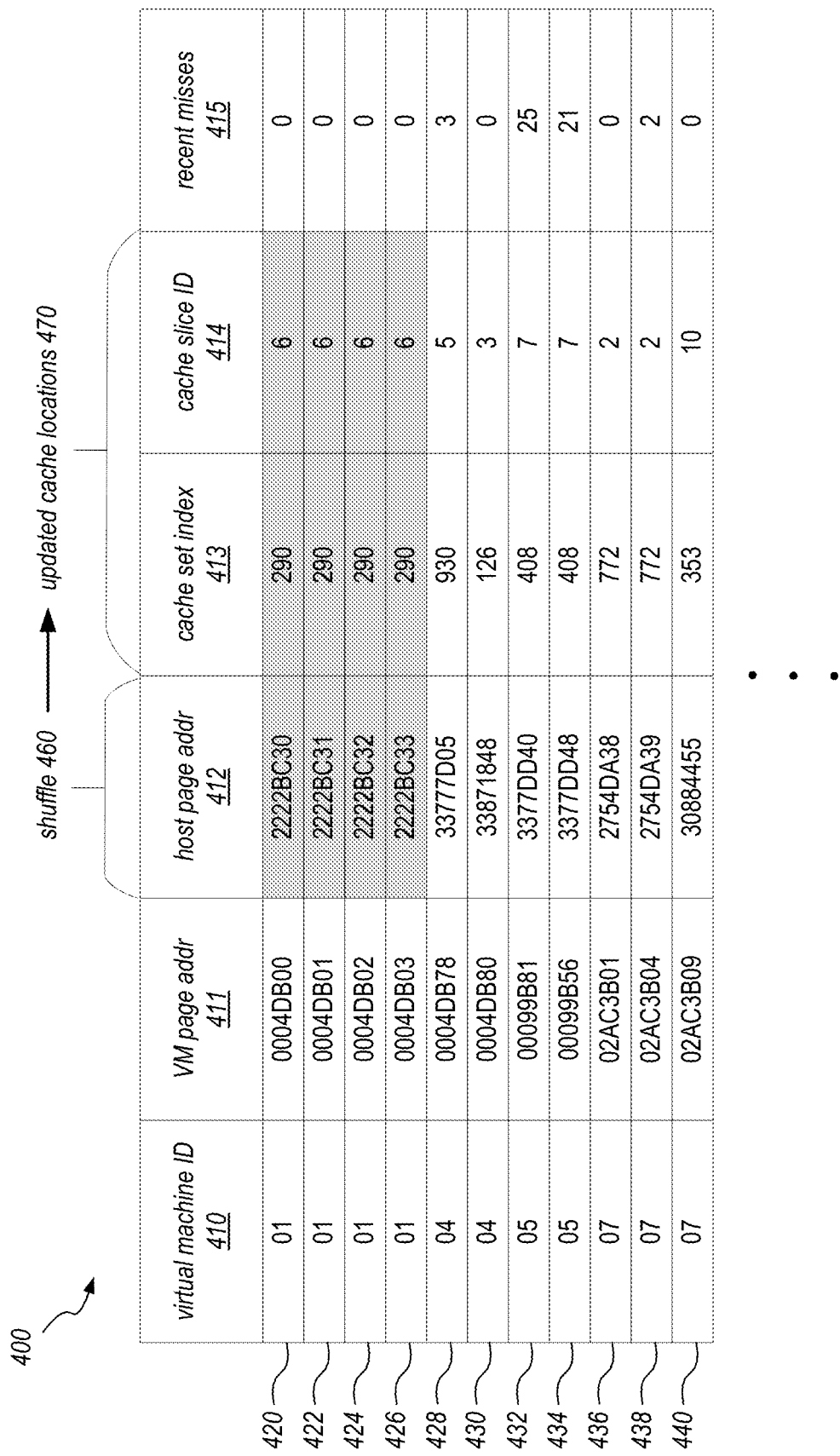

FIGS. 4A and 4B illustrate views of a page table that is used to mitigate side-channel attacks using a shared cache, according to some embodiments. FIG. 4A shows a view of a page table 400 before a shuffle operation. The page table 400 may be maintained by for example the VMM 120 or the memory usage monitor 124, as discussed in connection with FIG. 1. The page table 400 may be accessible by the memory map shuffler 126 of FIG. 1. In some embodiments, the page table 400 may be an extension of the memory map 122 shown in FIG. 1. As discussed, in some embodiments, the memory map 122 may be a number of shadow page tables that are maintained by the VMM 120 to track the page tables of each guest VM. However, unlike the page tables maintained by the guest VMs' operating systems, the shadow page tables may reference actual memory pages of the underlying host. In the illustrated page table of FIG. 4, the shadow tables of the guest VMs are merged into a global table with a field virtual machine ID 410 that identifies the guest VM that holds the memory page referenced in the entry. The VMM 120 may not maintain a global page table for all of the VMs, and instead access each of the shadow tables individually.

As illustrated, the page table 400 main contain a number of fields for each memory page entry, include the VM page address 411, the host page address 412, the cache set index 413, the cache slice ID 414, and recent misses 415. In other implementations, not all of these fields may be explicitly maintained, and additional fields may be included.

The VM page address 411 and host page address 412 may be sourced from or maintained as the VMM's traditional shadow page tables. Specifically, one of the central purposes of the memory map 122 is to keep track of the mapping between the memory pages as seen by the VM and the actual memory pages in the host's main memory.

On the other hand, the cache set index 413, the cache slide ID 414, and the recent misses field 415 may be new fields that are added to enable the monitoring functionality of the memory usage monitor 124. These monitored statistics 450 may be computed or collected by the VMM 120 or memory usage monitor 124 based on available information. For example, in some systems, the cache set index 413 may simply be a portion of the host memory page address. For example, this is the case for certain processors in the INTEL™ XEON™ family of processors, which assigns physical memory pages to cache sets in the LLC based on bits 6 to 16 in the main memory page address. That is, bits 6 to 16 in the main memory address is the cache set index. The cache slice ID 414 may also be computed from the main memory page address. For example, for certain INTEL™ XEON™ processors, the slice ID is computed based on a hash of the bits of the main memory page address. The hash function for INTEL™ XEON™ processors is undocumented but has been reversed engineered. Thus, using this hash function, the VMM 120 or memory usage monitor 124 may determine the slice that each given memory page will be located in the host's LLC. The recent misses statistic 415 may be maintained over a recent time interval or number of access attempts. The VMM 120 or memory usage monitor 124 may detect a cache miss based on the latency of a memory access. In some embodiments, the host operating system may provide information for each memory access, explicitly indicating to the VMM 120 whether a given memory page access was a cache hit or a cache miss. This information may be aggregated by the VMM 120 or memory usage monitor 124, and stored in the page table 400 as part of the monitored statistics 450.

The monitored statistics 450 may be used by the VMM 120 or memory usage monitor 124 in a variety of ways to make decisions about the memory page shuffling. For example, memory usage monitor 124 may periodically rank the memory pages to determine the pages that exhibit the highest recent miss rates. Pages that are receiving a large number of cache misses are possible pages of an attacker or a page of a victim under attack. For example, as illustrated in FIG. 4A, pages 422, 424, 432, and 434 have experienced a large number of recent misses. The memory usage monitor 124 may flag these pages as candidates to be shuffled by the memory map shuffler 126.

In some embodiments, the memory usage monitor 124 may analyze the memory usage pattern of the VMs and determine that a particular VM is an attacker VM engaging or attempting a side-channel attacker. The memory usage monitor 124 may also determine one or more victim VMs of a side-channel attack from the monitored statistics. For example, as illustrated in FIG. 4A, the memory usage monitor 124 may recognize that VM 01 (according field 410) is an attacker VM because it is occupying a large number of memory pages caching to the same cache set, as indicated by page table entries 420, 422, 424, and 426. The memory usage monitor 124 may recognize this behavior as indicative of a likely side-channel attack, and that entries 420, 422, 424, and 426 may constitute an eviction set that is constructed by attacker VM 01. In some embodiments, the memory usage monitor 124 may recognize that the memory pages held by an attacker VM is causing collisions with the memory pages of other VMs. For example, as shown in FIG. 4A, the memory usage monitor 124 may detect that some pages in a possible eviction set of attacker VM 01 collides with pages of another VM 05, as indicated by page table entries 432 and 434. This collision may be recognized from the fact that the pages of the two VMs 01 and 04 have the same cache set index 413 and cache slice ID 414. Moreover, the recent misses field may indicate that this collision is generating a high level of cache contention between the two VMs. Accordingly, the memory usage monitor 124 may instruct the memory map shuffler 126 to shuffle the memory pages of the attacker VM 01 or the victim VM 05. In some cases, memory usage monitor 124 may elect to shuffle the pages of the attacker VM 01 by default, because the attacker VM is the VM that is causing the contention. In some embodiments, the memory usage monitor 124 may maintain some state information for each VM between cycles of monitoring and shuffling, and pay particular attention to a suspected attacker VM over time. If the attacker VM continues to cause cache collisions on the host despite memory page shuffling, the memory usage monitor 124 may take further actions against the attacker VM, which may include logging the behavior of the attacker VM, isolating the memory usage of the attacker VM, shutting down the attacker VM, and/or alerting the administrator.

Turning to FIG. 4B, FIG. 4B depicts a view of a page table 400 after a shuffle operation. As shown, the suspected eviction set of a potential attacker VM 01 (entries 420, 422, 424, and 426) has been shuffled 460, as shown by the updated values in field 412, so that the host main memory pages backing the VM pages in these entries are changed. This shuffle may involve both a change the memory mapping (e.g., the shadow page tables maintained by the VMM) and also a movement of the contents of the pages from one location in the host main memory to another location. As a result, the memory pages of VM 01 no longer map to the same locations in the shared cache as before, as indicated by the fields 470. Importantly, the memory pages of VM 01 no longer collide with the pages of VM 05 in the shared cache. Thus, the shuffle 460 may have thwarted or prevented a side-channel attack.

As discussed, the shuffle operation 460 may be carried out by a module in the VMM 120, such as the memory map shuffler 126 discussed in connection with FIG. 1. In some embodiments, the memory map shuffler 126 may carry out the shuffling in a way that it is not readily detectable by the VM holding the pages. For example, the memory map shuffler 126 may first copy the contents of the pages to new locations in the host main memory, and then update the memory map in an atomic operation that does not cause any detectable latency to the VM. In some cases, the memory map shuffler 126 may place the VM's pages in read-only mode, while they are moved to new locations in the main memory. In some cases, the memory map shuffler 126 may simply cause the VM's memory pages to be flushed from the cache hierarchy, so that the next access by the VM will result in a cache miss. In some embodiments, the memory map shuffler 126 may be shuffle the memory pages repeatedly. This repeated shuffling may be done to guard against the attack efforts of a potential attacker VM, to protect a particular victim VM from possible attacks, or as a general measure to reduce cache contention on the host. The shuffling may be repeated periodically at pseudorandom intervals, where the intervals are shorter than a time requirement to carry out a side-channel attack. For example, the intervals may be set such that they shorter than the time required to perform a particular step of a known side-channel attack.

The memory map shuffler 126 may select a new location for the shuffled memory pages in the host's main memory in a variety of ways. In some case, the memory map shuffler 126 may ensure that a page's new location in the host main memory is different from the page's old location prior to shuffling. For example, in some embodiments, the memory map shuffler 126 may select a new host main memory location from a pool of host memory pages allocated to the VMM, where the new host memory location will map to a different cache set or cache slice from the old host memory location. In some embodiments, the memory map shuffler 126 may select a new host memory location that avoids cache collision with the pages of a victim VM, even avoids cache collision with any other VM pages, based on the monitored metrics data maintained in page table 400. In some embodiments, the memory map shuffler 126 may implement one or more quarantined areas in the host main memory for particular memory pages. For example, the memory map shuffler 126 may always move the memory pages of a particular VM to a particular cache set or cache slice that are not used by other VMs managed by the VMM. This quarantine measure effectively isolates a VM's use of the host main memory from the memory use of other co-located VMs.

Figure 5:
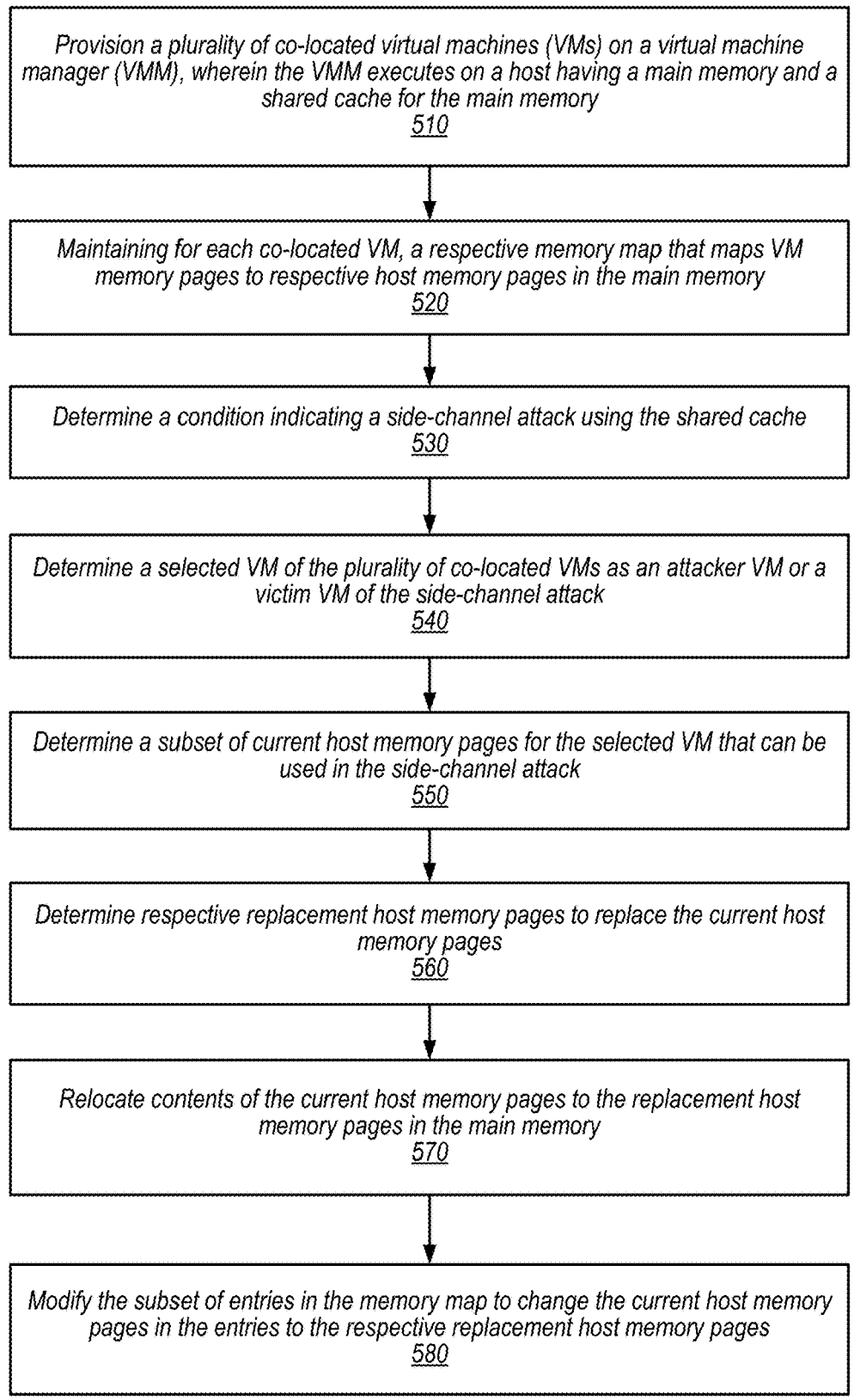
FIG. 5 is a flowchart diagram illustrating a process of operating a computer system that mitigates side-channel attacks using a shared cache, according to some embodiments.

FIG. 5 is a flowchart diagram illustrating a process of operating a computer system that mitigates side-channel attacks using a shared cache, according to some embodiments. The operations in FIG. 5 may be performed by the VMM 120, the memory usage monitor 124, and/or the memory map shuffler 126, as discussed in connection with FIG. 1.

At operation 510, a plurality of co-located VMs are provisioned on a VMM. The VMM may execute on a host having a main memory and a shared cache for the main memory. The VMs, VMM, and host, may be implemented as the VMs 112, VMM 120, and host 100, as discussed in connection with FIG. 1. As discussed, the shared cache may be a last level cache (LLC) of the host's main memory. In some embodiments, the shared cache may be an inclusive cache of one or more levels of lower level cache that contains the cached entries of the lower levels of cache. In some embodiments, the shared cache may be divided into a number of slices, which may be accessible to a plurality of processor cores. The cache slices may be addressable using a cache slice ID, which is required to uniquely identify locations in the shared cache. In some embodiments, the slice ID may be computed based on a hash function applied to the host memory page address. In some embodiments, the host may provide memory pages that come in different sizes. For example, INTEL™ XEON™ machines may provide 4 KB, 2 MB, and 1 GB memory pages. In some embodiments, VMMs may prefer to use larger page sizes for VMs because it reduces contention in the translation lookaside buffer. The page address for the host memory pages may contain a large bit range for the page offset, which may be invariant under the page address translations performed by OS or the VMM. For larger page sizes, the bit range for the page offset may contain all of the bits that are used to identify the cache set index for the host memory page. One particular embodiment of the host is a server that employs a processor of the INTEL™ XEON™ processor family.

At operation 520, a respective memory map that maps VM memory pages to respective host memory pages in the main memory is maintained for each co-located VM. Operation 520 may be performed by the VMM 120 of FIG. 1. In some embodiments, the memory maps, which may be memory maps 122 of FIG. 1, may comprise one or more shadow page tables that are maintained by the VMM. In some embodiments, the one or more shadow page tables may be consolidated into a global page table for all VMs, as depicted in FIGS. 4A and 4B. In some embodiments, the host memory pages that are used for the memory maps may be themselves periodically shuffled using the shuffling operation described herein. Such periodic shuffling may protect the memory management operations of the VMM from being observed by a potential attacker.

At operation 530, a condition indicating a side-channel attack using the shared cache is determined. Operation 530 may be performed by the memory usage monitor 124, as discussed in connection with FIG. 1. The condition may be detected based on a number of monitored metrics or statistics that are collected or computed by the VMM 120 or the memory usage monitor 124, as shown in FIGS. 4A and 4B. In some embodiments, the condition may be based on a high cache miss rate that is observed for some memory pages. In some embodiments, the condition may be based on an observed pattern of access of the shared cache by one or more of the plurality of co-located VMs.

In some embodiments, it may not be necessary to actually detect a condition indicating a side-channel attack before initiating a memory page shuffle. In some embodiments, memory page shuffle operations may be performed periodically and routinely, simply as a preventative measure. For example, in some cases, the memory pages in the page tables may be periodically sorted according to a recent miss rate, and those pages that exhibit the highest miss rate may shuffled. These periodic shuffles may occur at pseudorandom time intervals, and the time intervals may be chosen such that they are shorter than the time required to carry out a particular step of a know side-channel attack. The periodic shuffles have the additional benefit of reducing overall cache contention.

At operation 540, a selected VM is determined, from the plurality of co-located VMs, as an attacker VM or a victim VM of the side-channel attack. This operation may be performed by the memory usage monitor 124 of FIG. 1, and may be performed in conjunction with operation 530. That is, as part of determining a condition indicating a side-channel attack, an attacker VM or a victim VM may be identified. For example, the monitored metrics or statistics may be examined to reveal that a particular VM is maintaining large number of memory pages that map to the same cache set in the shared cache, effectively occupying that entire cache set. This type of access pattern may indicate a potential side-channel attack that is implemented by the VM, such as a prime and probe attack. The owner of the eviction set pages may be identified to be the attacker VM. Similar analysis of the monitored statistics may reveal a victim VM. For example, the memory usage monitor 124 may observe cache collisions in the shared cache, and analyze the behavior of the two or more VMs whose pages are involved in the collision. Based on the analyze, one of the VMs may be identified to be the attacker VM, and another VM the victim VM. In some embodiments, one or more VMs may be identified as an affected party in a side-channel attack without determining whether the VMs are attackers or victims. For example, in some embodiments, the monitor may detect two VMs that are generating a large number of mutual collisions in the shared cache. The system may target on both of the VMs for memory page shuffling operations without identifying which is the attacker and which is the victim.

At operation 550, a determination is made that a subset of current host memory pages for the selected VM that can be used in the side-channel attack. Operation 550 may be performed by the memory usage monitor 124 of FIG. 1, and may be performed in conjunction with operations 530 and 540. For example, when an attacker VM is identified per operation 540, a further analysis may reveal a potential eviction set that is being maintained by the attacker. In some embodiments, the subset of host memory pages selected may be all current memory pages held by the attacker VM. In some embodiments, the subset of current host memory pages may correspond to memory pages that have caused some cache collisions. In some embodiments, the subset of pages may be determined without identifying the actual attacker or victim VM. For example, the memory usage monitor 124 may determine from just the monitored metrics and statistics that a set of memory pages constitutes a likely eviction set, or that a group of memory pages are creating abnormally high cache contention. Based on this determination, the memory usage monitor 124 may conclude that these memory pages are being used or observed in a side-channel attack.

At operation 560, for each current host memory page in the subset, a replacement host memory page is determined to replace the current host memory page. In some embodiments, operation 560 may be performed by the memory map shuffler 126, as discussed in connection with FIG. 1. In some embodiments, this determination is made at least in part by the memory usage monitor 124 of FIG. 1. In some embodiments, the replacement memory pages are selected based on the monitored metrics or statistics as shown in FIGS. 4A and 4B. In some embodiments, the VMM may request from the host OS a pool of allocated memory pages from the main memory, and the memory map shuffler 126 may select pages from the pool according to the requirements of the particular shuffle operation. Depending on the situation or the embodiment, the memory map shuffler 126 may select a replacement host memory page that maps to a different location in the shared cache than the old host memory page being replaced. For example, the new host memory page may to chosen so that it caches to a different cache set or cache slice in the shared cache. In some embodiments, the new host memory page may be chosen so that it creates no collision or minimal collision with the exiting set of memory pages that are being managed by the VMM. In some embodiments, the memory map shuffler 126 and/or the memory usage monitor 124 may maintain isolated areas of the host main memory as quarantined areas, which cannot be shared freely among all VMs. For example, the memory map shuffler 126 and/or the memory usage monitor 124 may designate a particular cache set or cache slice as the quarantined area for an attacker VM or a victim VM. During a memory map shuffle, the memory map shuffler 126 will assign new host pages such that no other VM will receive a host memory page that will cache to this quarantined area.

At operation 570, the contents of the current host memory pages are relocated to the replacement host memory pages in the main memory. Operation 570 may be performed by the memory map shuffler 126 of FIG. 1, and in conjunction with operation 580. As discussed, depending on the embodiment, the relocation step may occur either before or after the modification of the memory map. In some embodiments, the shuffling of memory pages may be carried out in a way that is not detectable by the VM that owns those pages. For example, the memory map shuffler 126 may first move the contents of the old host memory pages to the new host memory pages. Then, the memory map shuffler 126 may modify the memory map for the VM to refer to the new host memory pages, in a single atomic operation.

At operation 580, the subset of entries in the memory map are modified to change the current host memory pages in the entries to the respective replacement host memory pages. Operation 580 may be performed by the memory map shuffler 126 of FIG. 1. In some embodiments, the modification of the memory map may occur after the move or copy of the memory pages in the main memory. In some embodiments, the operation may simply involve updating the records in the shadow page tables maintained by the VMM. In some embodiments, the memory map shuffler 126 may mark the memory page entries in the memory map as read-only while those entries are being shuffled. Thus, the VM that owns the pages may experience a period where its memory pages are not fully usable.

In some embodiments, the shuffling process may allow the VM pages to be modified during a portion of the shuffle operation. For example, in one exemplary shuffling operation, the shuffler may first clear the dirty bit in the page table entry for the page to allow the cache system to detect any writes to the page during the shuffling process. The shuffler may then copy the contents of the memory page to a replacement memory page in the main memory. During the copy, the page may be available for writes to the VM. After the copy in the main memory is completed, the shuffler may check to see if the dirty bit for the page in the cache has been set, indicating a recent write to the memory page. If there have been no recent writes, the shuffler may update the memory mappings so that the VM now uses the replacement memory page. However, if there have been recent writes to the memory page, the shuffler may make another attempt to shuffle by copying the memory page in the main memory again. In some embodiments, the checking of the dirty bit in the cache and the updating of the memory map may occur atomically, such that no writes can take place between the check and the modification of the memory map.

In some embodiments, the memory map shuffler 126 may perform the shuffling operation during a time when the owner VM is not actively executing. In some embodiments, the memory map shuffler 126 may divide the shuffling of pages into groups, so that they may be carried out gradually over multiple idle periods of the owner VM.

Figure 6:
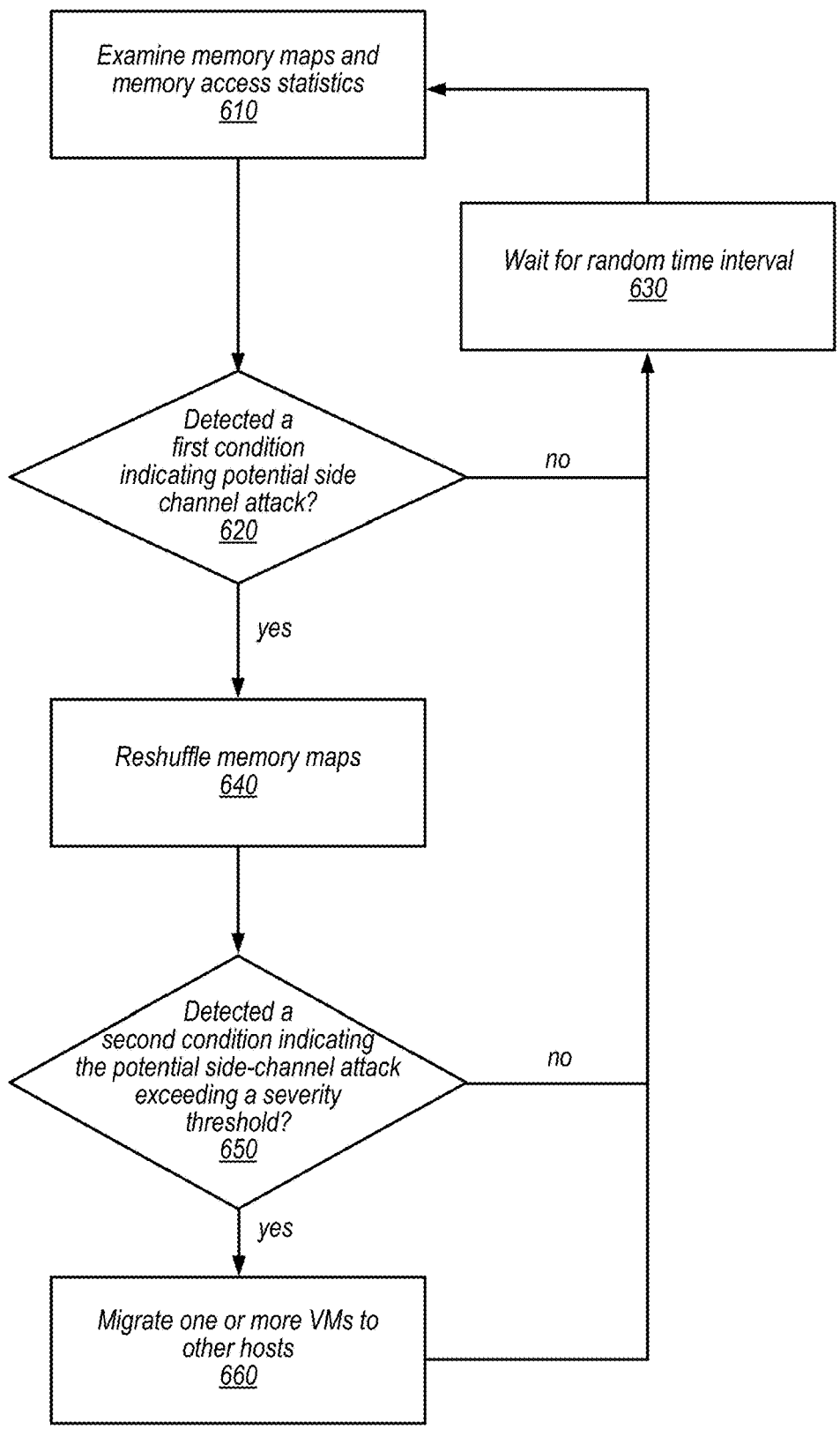
FIG. 6 is another flowchart diagram illustrating a process of operating a computer system that mitigates side-channel attacks using a shared cache, according to some embodiments.

FIG. 6 is another flowchart diagram illustrating a process of operating a computer system that mitigates side-channel attacks using a shared cache, according to some embodiments. The operations of the operations in FIG. 6 may be carried out by a combination of the VMM 120, the memory usage monitor 124, and/or the memory map shuffler 126, as discussed in connection with FIG. 1. The process depicted in FIG. 6 may be implemented as a background process that operates above, alongside, or within the VMM, which is configured to continually monitor the VMs' memory usage and protect the VMs on the host from side-channel attacks.

At operation 610, the memory maps and associated memory access statistics are examined. Operation 610 may be performed by for example the memory usage monitor 124 of FIG. 1, and the memory access statistics may include the monitored statistics 450 as illustrated in FIGS. 4A and 4B. In some embodiments, the examination operation may include operations 530, 540, and/or 550, as discussed in connection with FIG. 5.

At operation 620, a determination is made whether a first condition indicating a potential side channel attack is detected. Operation 620 may be performed by the memory usage monitor 124 of FIG. 1, and the determination may include operations 530, 540, and/or 550, as discussed in connection with FIG. 5. For example, in some embodiments, a detected condition may include an identification of an attacker VM, a victim VM, and/or an eviction set. In some embodiments, a detected condition may simply include observation of a high cache miss rate for particular memory pages in the memory map.

If no conditions of a potential side-channel attack are detected, at operation 630, the process waits for a random time interval, before repeating the examination operation 610. Thus, the entire process operates in a loop that continuously monitors the memory maps and the collected and/or computed memory access statistics for signs of a potential side-channel attack. The wait time interval is random, so that it is difficult for an attacker to predictably observe or avoid the check. In some embodiments, the wait time interval is configurable by the administrator, so that it may be set to suit the particular needs of the host, to balance the level of protection against the disruption that is created by the protection process.

If some condition of a potential side-channel attack is detected, at operation 640, the memory maps are reshuffled. Operation 640 may be performed by the memory map shuffler 126 of FIG. 1, and may include some combination of operations 560, 570, and 580, as discussed in connection with FIG. 5. Thus, the continuous process of FIG. 6 does not always reshuffle the memory pages of the VMs, but only occasionally, when a need arises. By performing the reshuffling infrequently, the process is made less predictable and less susceptible to observation and countermeasures. Moreover, depending on the conditions that trigger the occasional reshuffles, the process creates the added benefit of reducing overall cache contention on the host.

At operation 650, a determination is made whether a second condition indicating a potential side channel attack exceeding a severity threshold is detected. Operation 650 may be performed by the memory usage monitor 124 of FIG. 1, and the second condition may be determined based on the monitored statistics 450 as illustrated in FIGS. 4A and 4B. During the process of FIG. 6, the first condition detected in operation 620 may be a less severe condition that triggers a routine shuffling of the VM's memory pages. However, in some cases, the situation may indicate a second condition that exceeds a severity threshold. The second condition may trigger a more severe response in addition to the reshuffling of the memory pages. For example, the memory usage monitor 124 may compute, based on the memory usage pattern in the memory map, a probability score of a potential side-channel attack. The memory usage monitor 124 may be configured to trigger a memory page reshuffle when the probability score reaches a first level (first condition), and trigger a more severe response when the probability score reaches a second level (second condition). In another example, the first condition may be detected when the cache miss rate of particular memory pages reach one level, and the second condition may be detected when the cache miss rate reaches a high level. In some embodiments, the memory usage monitor 124 may maintain additional state for the VMs that are kept over long periods of time. A particular VM that appears to be attempting side-channel attacks may be tracked by the memory usage monitor 124. The memory usage monitor 124 may simply reshuffle the memory pages of the particular VM for a first few times. However, if the particular VM is observed to continually and repeatedly exhibit malicious behavior after a few reshuffles, the second condition exceeding a severity threshold may be detected.

If a second condition exceeding the severity threshold is not detected, the process proceeds back to operation 630 to continue to the next iteration of the continuous loop. However, if a second condition exceeding the severity threshold is detected, the process proceeds to operation 660. Operation 660 may be implemented by the VMM 120, and may include a variety of actions. At operation 660, in some embodiments, one or more VMs on the host may be migrated to another host. Depending on the embodiment or policy of the operator, an attacker or victim VM may be migrated to a different host. In some embodiments, the new host may be configured to more closely observe the VM to determine if the VM is attempting an attack. In some embodiments, other types of responsive action may be performed, for example isolating the memory usage of a suspected attacker or victim, or even shutting down an attacker VM. In some embodiments, an administrator of the host may be notified. In some embodiments, the VMM 120 may forward an alert to the administrator via an email, a text, a call, or some other communication means, indicating that a severe side-channel attack has been detected. The communication may include a log of memory usage activities and/or metrics and statistics that evidence the suspected attack. Operation 660 and the foregoing response actions may be configurable by an administrator of the host. A person of ordinary skill would understand that the programmed response in such a situation may include a variety of different actions, that are not limited to the particular actions described herein. The process depicted in FIG. 6 may be programmed or configured to carry out other actions in response to the detected conditions, without departing from the spirit of the inventions disclosed herein.

Figure 7:
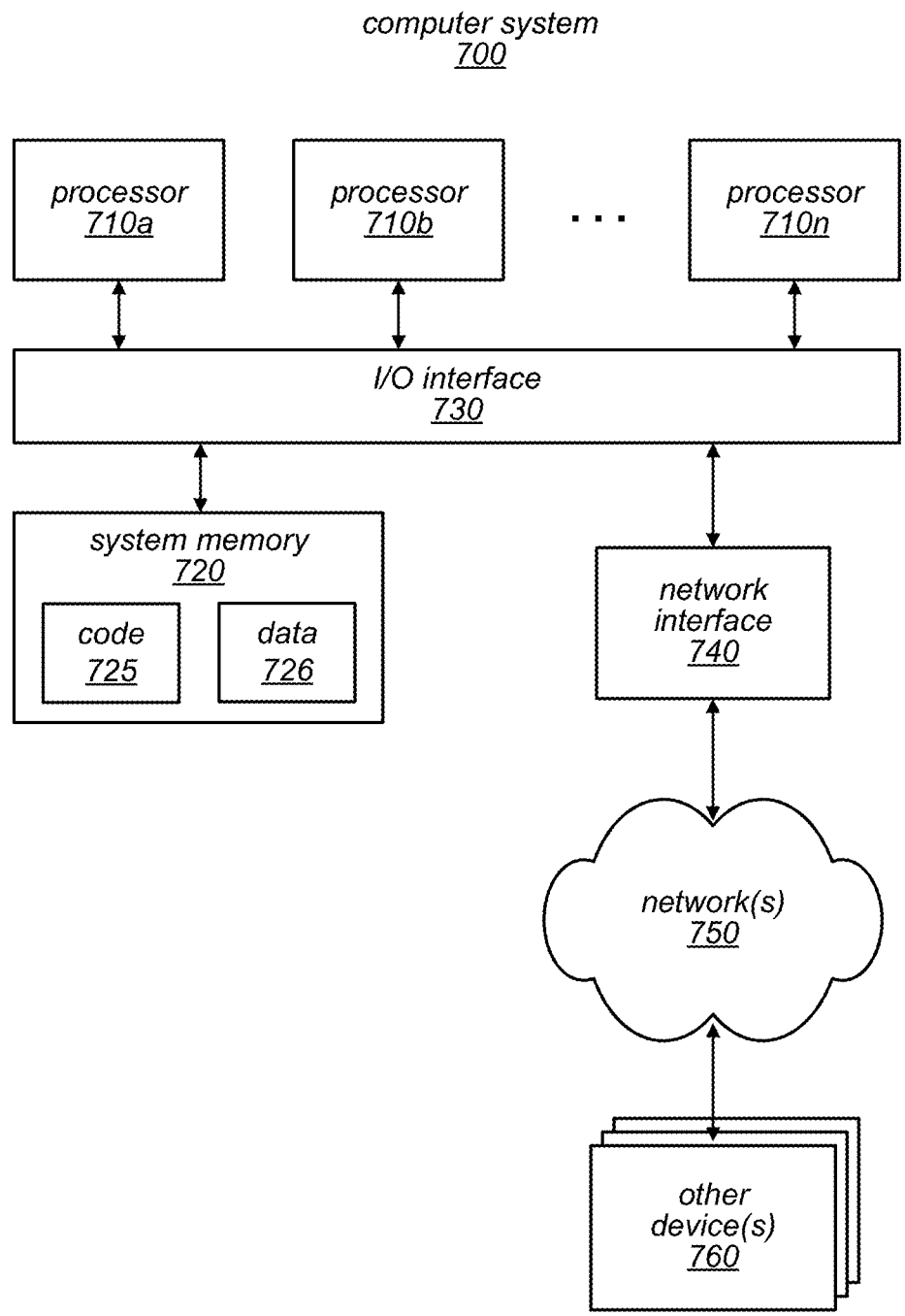
FIG. 7 is a block diagram illustrating an example computer system that mitigates side-channel attacks using a shared cache, according to some embodiments.

FIG. 7 is a block diagram illustrating an example computer system that mitigates side-channel attacks using a shared cache, according to some embodiments. Computer system 700 may include or be configured to access one or more nonvolatile computer-accessible media. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code 725 and data 726. The system memory 720 may include different levels of cache, some of which may be located on the CPU and some away from the CPU. One level of the cache hierarchy may be a last level cache that is shared by all of the processors 710*a* to 710*n*. The last level cache may be an inclusive cache of the low levels of cache in the cache hierarchy.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices, such as routers and other computing devices, as illustrated in FIGS. 1 through 6, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or nonvolatile media such as RAM (e.g. SDRAM, DDR SDRAM, RDRAM, SRAM, etc.), ROM, etc, that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a host comprising one or more hardware processors and memory, including a main memory and a shared cache for the main memory,
   wherein the host is configured to execute a virtual machine manager (VMM) for supporting a plurality of co-located virtual machines (VMs) that share the shared cache, the VMM maintaining, for each VM of the plurality of co-located VMs, a respective memory map that maps VM memory pages to respective host memory pages in the main memory;
   wherein the VMM is configured to:
   determine at least a subset of current host memory pages for a selected VM that are subject to a potential occurrence of a side-channel attack, wherein each current host memory page is associated with an entry in the memory map, and the determination is based at least in part on detected collisions in the shared cache between the selected VM and another co-located VM for the subset of current host memory pages;
   relocate contents of the current host memory pages to replacement host memory pages in the main memory, wherein the relocation avoids collisions in the shared cache between the selected VM and the other co-located VM for the subset of current host memory pages to hinder the potential occurrence of the side-channel attack; and
   modify the associated entries in the memory map to change the current host memory pages to the respective replacement host memory pages.

2. The system of claim 1, wherein:
   the shared cache is divided into a number cache slices each having a slice identifier,
   the slice identifier is required to uniquely identify locations in the shared cache, and
   the slice identifier is computed based at least in part on a hash function applied to a host memory page address.

3. The system of claim 1, wherein the VMM is configured to select a replacement host memory page that maps to a different cache set of the shared cache from a corresponding current host memory page.

4. The system of claim 1, wherein the shared cache comprises a last level cache (LLC) for the main memory, and the LLC is an inclusive cache for one or more levels of lower level cache.

5. The system of claim 1, wherein the main memory is configured to allocate memory pages of a first minimum size and a second larger size, and the VMM is configured to allocate memory pages of the second larger size to the VMs.

6. The system of claim 1, wherein to relocate the contents of the current host memory pages, the VMM is configured to repeatedly relocate the current host memory pages at time intervals that are shorter than a time requirement to carry out a step of the side-channel attack.

7. The system of claim 1, wherein VMM is configured to determine the subset of current host memory pages based at least in part on a cache miss rate monitored for the subset of current host memory pages.

8. A method, comprising:
   provisioning, on a virtual machine manager (VMM), a plurality of co-located virtual machines (VMs), wherein the VMM executes on a host implemented by one or more hardware processors and memory, including a main memory and a shared cache for the main memory;
   maintaining, by the VMM, for each VM of the plurality of co-located VMs, a respective memory map that maps VM memory pages to respective host memory pages in the main memory;
   determining at least a subset of current host memory pages for a selected VM that are subject to a potential occurrence of a side-channel attack, wherein each current host memory page is associated with an entry in the memory map, and the determination is based at least in part on detected collisions in the shared cache between the selected VM and another co-located VM in the subset of current host memory pages;

relocating contents of the current host memory pages to replacement host memory pages in the main memory, wherein the relocation avoids collisions in the shared cache between the selected VM and the other co-located VM for the subset of current host memory pages to hinder the potential occurrence of the side-channel attack; and modifying the associated entries in the memory map to change current host memory pages in to the replacement host memory pages.

9. The method of claim 8, further comprising determining that the selected VM is an attacker VM of the side-channel attack.

10. The method of claim 9, wherein determining the subset of current host memory pages for the selected VM comprises determining one or more eviction sets used by the attacker VM.

11. The method of claim 8, further comprising determining that the selected VM is a victim VM of the side-channel attack.

12. The method of claim 8, wherein determining the subset of current host memory pages of the selected VM comprises determining a set of current host memory pages based at least in part on a cache miss rate of host memory pages associated with the entries.

13. The method of claim 8, wherein relocating the contents of the current host memory pages comprises repeatedly relocating the current host memory pages at time intervals that are shorter than a time requirement to carry out a step of the side-channel attack.

14. The method of claim 8, further comprising determining a condition indicating the side-channel attack, and wherein the relocating of the current host memory pages is triggered based at least in part on the determination of the condition.

15. The method of claim 14, wherein determining the condition indicating the side-channel attack comprises determining a cache miss rate of pages in the shared cache.

16. The method of claim 14, wherein determining the condition indicating the side-channel attack comprises detecting a recognized access pattern of the shared cache by one or more of the plurality of co-located VMs.

17. A non-transitory computer-accessible storage medium storing program instructions that when executed on one or more processors cause the one or more processors to:

provision, on a virtual machine manager (VMM), a plurality of co-located virtual machines (VMs), wherein the VMM executes on a host implemented by one or more hardware processors and memory, including a main memory and a shared cache for the main memory;

maintain, by the VMM, for each VM of the plurality of co-located VMs, a respective memory map that maps VM memory pages to respective host memory pages in the main memory;

determine at least a subset of current host memory pages for a selected VM that are subject to a potential occurrence of a side-channel attack, wherein each current host memory page is associated with an entry in the memory map, and the determination is based at least in part on detected collisions in the shared cache between the selected VM and another co-located VM for the subset of current host memory pages;

relocate contents of the current host memory pages to replacement host memory pages in the main memory, wherein the relocation avoids collisions in the shared cache between the selected VM and the other co-located VM for the subset of current host memory pages to hinder the potential occurrence of the side-channel attack; and modify the associated entries in the memory map to change the current host memory pages to the respective replacement host memory pages.

18. The non-transitory computer-accessible storage medium of claim 17, wherein to relocate the contents of the current host memory pages to replacement host memory pages, the program instructions when executed cause the one or more processors to select a replacement host memory page from a plurality of allocated host memory pages in a pseudorandom fashion.

19. The non-transitory computer-accessible storage medium of claim 17, wherein to relocate the contents of the current host memory pages to replacement host memory pages, the program instructions when executed cause the one or more processors to select a replacement host memory page for a current host memory page that maps to a different cache set in shared cache from the current host memory page.

20. The non-transitory computer-accessible storage medium of claim 17, wherein the program instructions when executed cause the one or more processors to mark a VM memory page as read only prior to modifying an entry in the memory map associated with the VM memory page.

\* \* \* \* \*